United States Patent
Kobayashi et al.

(10) Patent No.: US 6,459,387 B1
(45) Date of Patent: Oct. 1, 2002

(54) VEHICLE LIGHTING APPARATUS

(75) Inventors: Shoji Kobayashi; Kazuhiro Suzuki; Takeshi Masuda; Takashi Inoue, all of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 17 days.

(21) Appl. No.: 09/688,248

(22) Filed: Oct. 16, 2000

(30) Foreign Application Priority Data

Oct. 15, 1999 (JP) .......................................... 11-293605

(51) Int. Cl.⁷ .............................................. G08G 1/123
(52) U.S. Cl. ....................... 340/988; 362/37; 362/460; 362/465
(58) Field of Search ........................... 340/988; 362/37, 362/459, 460, 465, 528, 466

(56) References Cited

U.S. PATENT DOCUMENTS

| | | | | |
|---|---|---|---|---|
| 5,562,336 A | | 10/1996 | Gotou | 362/37 |
| 5,588,733 A | | 12/1996 | Gotou | 362/37 |
| 5,909,949 A | * | 6/1999 | Gotoh | 362/37 |
| 5,931,572 A | * | 8/1999 | Gotoh | 362/466 |
| 6,010,237 A | * | 1/2000 | Gotou | 362/460 |
| 6,254,259 B1 | * | 7/2001 | Kobayashi | 362/465 |
| 6,293,686 B1 | * | 9/2001 | Hayami et al. | 362/465 |

FOREIGN PATENT DOCUMENTS

GB    2 337 578    11/1999    ............ B60Q/1/14

* cited by examiner

*Primary Examiner*—John Tweel
(74) *Attorney, Agent, or Firm*—Sughrue Mion, PLLC

(57) ABSTRACT

A vehicle lighting apparatus is provided with a travel environment detecting means (2) for acquiring information indicative of a travel environment related to a travel path of a vehicle; a travel region judging means (3) for judging a travel region where the vehicle is presently traveling based upon the information acquired by the travel environment detecting means (2); and a lighting control means (4) for lighting control of a vehicle lighting member (6) in response to a judgement signal derived from the travel region judging means (3). For example, in response to a link number of nodes of a vehicle traveling path, which is obtained from a navigation apparatus (2a) constituting the travel environment detecting means (2), a travel region is judged based upon either a total value of the link numbers or an average value thereof, and an increase/decrease trend thereof. Thus, a travel region where a vehicle is traveling is judged to realize a vehicle lighting control suitable for this travel region.

20 Claims, 24 Drawing Sheets ptn_α

β

US 6,459,387 B1

VEHICLE LIGHTING APPARATUS

BACKGROUND OF THE INVENTION

The present invention is related to a technique capable of judging a travel region where a vehicle is presently traveling in order to perform a lighting control suitable for the travel region.

With respect to vehicle navigation methods, navigation methods using GPS (Global Positioning system) and other navigation methods utilizing road-to-vehicle communications are known in this technical field.

Various types of lighting control apparatuses have been proposed in which light distributions are varied in connection with travel conditions of vehicles in such a manner that lighting controls of vehicle lighting members are carried out based upon information acquired from navigation apparatuses.

However, the conventional lighting control apparatus cannot judge in which travel region the vehicle is traveling at the present stage. As a result, the conventional lighting control apparatus has problems. That is, the lighting control by this conventional lighting control apparatus can hardly guarantee that the vehicle lighting operation suitable for the region presently being traveled by the vehicle is carried out.

For instance, the conventional lighting control apparatus cannot judge whether the vehicle is traveling in a city area, or a suburb road, since the same lighting controls are carried out in both the above-described regions, the satisfactory lighting performance cannot be established.

SUMMARY OF THE INVENTION

The present invention has such an object that a travel region where a vehicle is now traveled is judged, and thus, a vehicle lighting control suitable for this judged travel region can be carried out.

Therefore, in order to solve the above-described problem, a vehicle lighting apparatus, according to the present invention, comprises a travel environment detecting means for acquiring information indicative of a travel environment related to a travel path of a vehicle; travel region judging means for judging the travel region where the vehicle is presently traveling based upon the information acquired by the travel environment detecting means; and lighting control means for performing a lighting control of a vehicle lighting member in response to a judgement signal derived from the travel region judging means.

As a consequence, in accordance with the present invention, while the information indicative of the travel environment as to the travel path of the vehicle is acquired, since the sort of the travel region is judged based upon this acquired information, the vehicle lighting apparatus can perform the lighting control suitable for the travel region of the vehicle.

BRIEF DESCRIPTION OF THE DRAWINGS

FIG. 3A is a diagram for showing a relationship between a node and a vector; and FIG. 3B is an explanatory diagram for explaining a method for acquiring a direction change of a vector from an outer product of vectors;

DETAILED DESCRIPTION OF THE PREFERRED EMBODIMENTS

Figure 1:
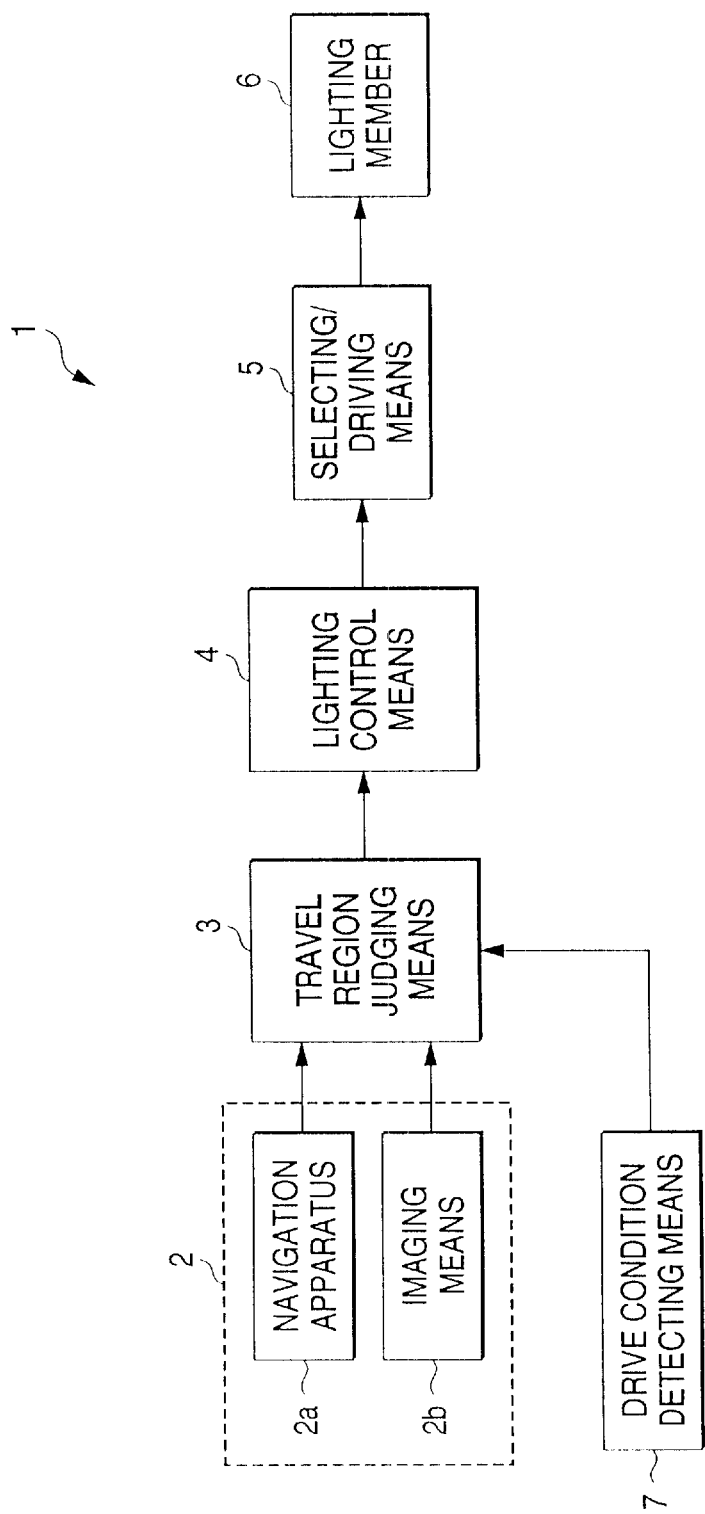
FIG. 1 is a diagram for indicating a basic structure of the present invention.

FIG. 1 shows a basic arrangement of a vehicle lighting apparatus according to the present invention.

A vehicle lighting apparatus 1 is provided with a travel environment detecting means 2, a travel region judging means 3, a lighting control means 4, and a selecting/driving means 5. The vehicle lighting apparatus 1 controls a lighting range, a lighting direction, and a light amount, and also a lighting distribution of a vehicle lighting member 6.

The travel environment detecting means 2 is a means for acquiring information indicative of a travel environment with respect to a travel path of a vehicle. For this travel environment detecting means 2, for example, a (vehicle) navigation apparatus 2a and an imaging means 2b may be utilized. The vehicle navigation apparatus 2a is operated by using a GPS (Global Positioning System) and a road-to-vehicle communication system. The imaging means 2b images a front scene of a vehicle, and/or a scene (peripheral scene) around a vehicle.

The travel region judging means 3 judges a travel region where the vehicle is presently traveling based upon the information obtained from the travel region environment detecting means 2. The below-mentioned travel region judging methods may be employed.

(I) A method for judging a travel region based upon information (namely, total link number of nodes and landmark data etc.) about a vehicle travel path, which is acquired by using a navigation apparatus.

(II) A method for judging a travel region based upon a road sign, and a sign such as a mark made on a road by analyzing image information acquired by an imaging means.

First, the judging method (I) will now be explained. This judging method (I) may contain the below-mentioned contents.

(I-a) A judging method of a city area, a suburb road, a superhighway (expressway), and the like.

(I-b) A judging method of either a curved path where an S-shaped curved area is continued or a road where a crooked area is continued.

The judging method (I-a) is employed in order to judge that a travel path of the vehicle belongs to which travel region, and this judging method will be explained with reference to an example where a GPS system is used.

Figure 2:
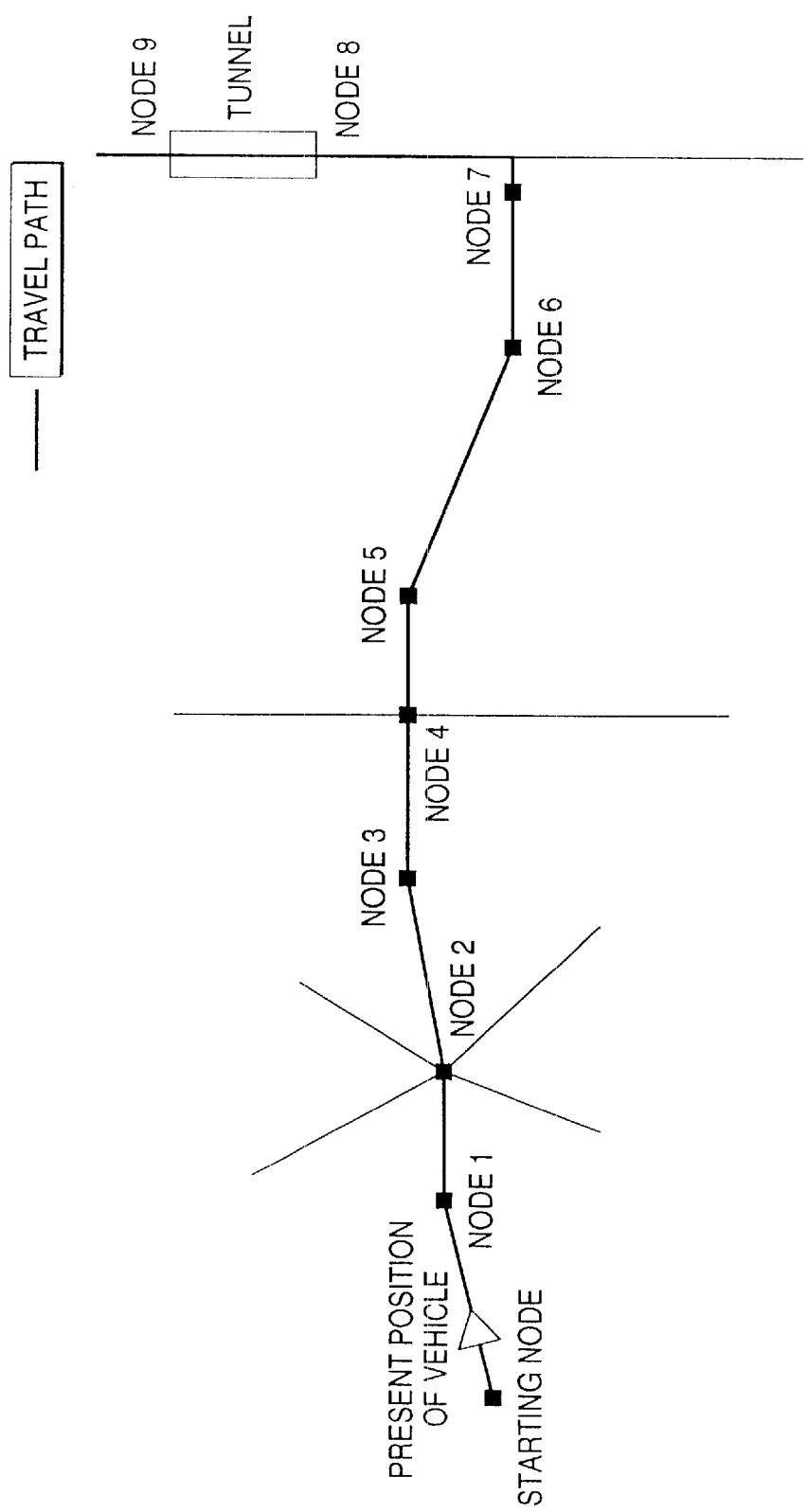
FIG. 2 is a diagram for schematically showing a road image of a travel path.

FIG. 2 schematically indicates a road image of a travel path acquired from a navigation apparatus. In this drawing, a position indicated by a mark "Δ" represents a present position of a vehicle, and another mark "■" shows a node. Also, a line indicated by a wide line represents a travel path of a vehicle, or a scheduled travel path of a vehicle.

In this drawing, road branch points are located at the node "2" and the node "4", and also both the node "8" and the node "9" correspond to an entrance and an exit of a tunnel.

This navigation apparatus is designed in such a manner that both present position information of a vehicle and road information of a travel path can be acquired in a periodic manner (for example, on the order of 0.5 seconds). As to the latter information (namely, road information of travel path), the closest road on the road map is determined based upon the present position of the vehicle, and further, this road information may be acquired after a route searching operation is accomplished. It should be noted that as to the route searching operation, a vehicle driver may enter a destination place, or a route may be determined with an assumption that a vehicle is presently traveling along a road when a vehicle driver cannot enter a destination place.

When this present position information of the vehicle is exemplified, the below-mentioned data may be listed:

Latitude of a present position.

Longitude of a present position.

Matched road (namely, azimuth of matched road measured at present position of vehicle).

Day/time information.

Also, with respect to the road information of the travel path, as exemplified in the below-mentioned table 1, the road data of the travel path after the map matching operation is obtained by setting the nodes used to form the road map, and the link information (namely, total number of roads connected to nodes and azimuth) to these nodes as basic data.

TABLE 1

| road data | contents | |
|---|---|---|
| node latitude | latitude of relevant node | |
| node longitude | longitude of relevant node | |
| total link number of node | total number of roads connected relevant node example: link number = 1 (starting point of road), link number = 2 (straight road), link number = 3 (crossroad made of 3 roads), link number – 4 (crossroad made of 4 roads, normal crossing) | |
| described expression data of travel path where node is present | described expression 1 | 0: free 1: toll |
| | described expression 2 (road sort) | 0: superhighway   1: vehicle-only-road 2: national road   3: main country road 4: prefecture road 5: basic road 6: others |
| | described expression 3 | 0: no tunnel 1: tunnel |
| | described expression 4 (lane number) | 0: not-yet-checked, or lane number of 1 as to road width ≦ 3 m 1: lane number of 1 as to road width ≦ 1 m 2: lane number of 2 3: lane number of 3 4: lane number of 4, --- |
| | described expression 5 | 0: no center separating area 1: center separating area |
| | described expression 6 | 0: flat 1: uphill slope 2: downhill slope |

As explained above, in the GPS navigation system, the travel path determined by the present position of the vehicle after the map matching operation is outputted as data about the latitude/longitude of the node group, and also the road type (road sort) of the travel path. As a result, although it is possible to easily judge as to whether or not the vehicle is traveling on, for instance, the superhighway (refer to described expression 2 of node in table 1), such a direct judgement cannot be made as to whether the vehicle is traveling in the city area, or on the suburb road. Otherwise, the above-described (I-b) cannot be directly judged.

Accordingly, generally speaking, while an attention is paid to such a strong trend that a larger number of crossings in roads of a city area, it is so judged as to whether or not a travel path corresponds to a city area based upon a total link number of nodes contained in a vehicle travel path. These crossings are expressed as such a node that a total link number is larger than, or equal to 3 in accordance with the definition of the above-described table 1.

For example, after a route (travel path) has been determined by the navigation apparatus, or when a travel path is determined after a route has been searched, a calculation is made of a total link number of nodes located within a predetermined distance range (or preselected travel time) from a present position of the vehicle. Alternatively, an average value (simple average value, moving average value, weighted average value) of link numbers is calculated. Then, the calculated value is compared with a predetermined judging threshold value, and when this calculated value is larger than the judging threshold value, it is judged that the vehicle is traveling in the city area road. To the contrary, when this calculated value is not larger than the judging threshold value, it is judged that the vehicle is traveling on a road other than that of the city area, for example, it is judged that the vehicle is traveling on a road in a suburb, or on a superhighway, which may be readily discriminated based on the described expression 2 of the node in the table 1. It should also be noted that the travel region judging process operation based upon the link number may be applied in response to the road sort information of the node in the travel path. For instance, a judgement is made whether or not the travel path of the vehicle corresponds to the superhighway. When the travel path of the vehicle is not equal to the superhighway, another judgement is made as to whether or not the travel region corresponds to the city area based upon the total number of links and the average value.

Also, the following calculations are made: how many places where a total link number of nodes exceeds a threshold value are present within a predetermined distance range (or travel time). Further, a distribution of these places and/or an increase/decrease trend (for example, either a increase amount or a decrease amount of link numbers per travel time, or travel distance) is calculated. As a result, a judgment is made as to whether or not the travel region corresponds to the city area.

In summary, if the travel region judging means 3 can judge as to whether or not the travel region corresponds to the city area by checking the total quantity of node link numbers of the vehicle travel path, the average value thereof, or the increase/decrease trend thereof, which are acquired from the navigation apparatus 2a, then any number of methods may be employed.

Next, a description will now be made of a method for judging a travel region by utilizing a road map database into which a landmark is additionally written.

In connection with great progress of the intelligent transport system (ITS), in the case that additional information such as landmarks are involved in road map data and thus, the information can be highly and advantageously utilized, it is possible to discriminate as to whether a node is located within a city area, or within a central area by utilizing this landmark data. In other words, a vehicle driver can directly grasp that a node located in a travel path of a vehicle belongs to which regional area.

Also, in a navigation apparatus adaptable to the road-to-vehicle communication system, since landmark information similar to the above information is transmitted from a road-sided signal generating apparatus (so-called "beacon") to a vehicle, a vehicle driver can directly grasp that a node positioned in a travel path of the vehicle belongs to which regional area.

As previously described, while the landmark information is acquired via the navigation apparatus, the sort of the travel region is directly judged based upon this acquired landmark information, which can contribute the high-speed information processing operation.

Next, the method (I-b) will now be explained.

Figure 3A:
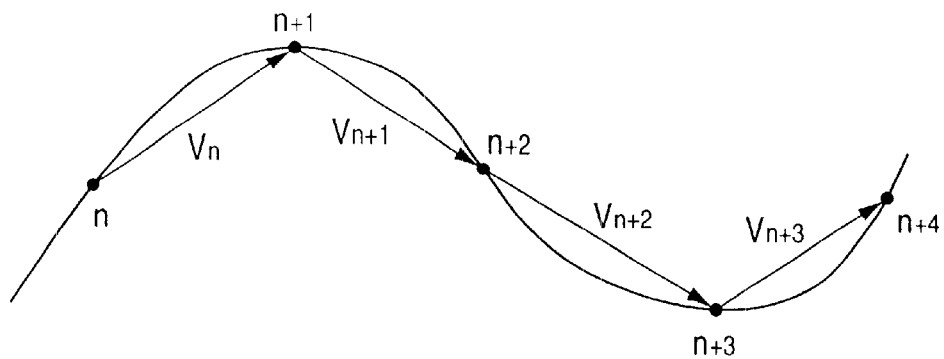
FIGS. 3A and 3B are explanatory diagrams for explaining a method for judging a curved path where an S-shaped curved portion is continued.

FIG. 3A is a conceptional diagram for indicating nodes "n", "n+1", - - -, "n+4" on a road in such an example that a travel path of a vehicle is located along an S-shaped road.

A road where an S-shaped curved path is continued is located in a suburb area, more specifically, in a mountain area. To judge such a curved road, for example, the below-mentioned method may be used.

(a) A method for calculating an outer product from vectors for coupling adjacent nodes to each other.

(b) A method for counting a point of inflection on a spline curve which passes through each of nodes.

A sequence of the method (a) is given as indicated in the below-mentioned (a-1) to (a-3).

(a-1) A vector is obtained which connects nodes located adjacent to each other on a vehicle travel path. For instance, in FIG. 3A, a vector "Vn" through a vector "Vn+3" are indicated. It is so defined that with respect to a vector "Vi" (i=n, n+1, - - -), this vector Vi connects a node "i" to another node "i+1", and a direction of this vector Vi is directed from the node "i" to the node "i+1".

Figure 3B:
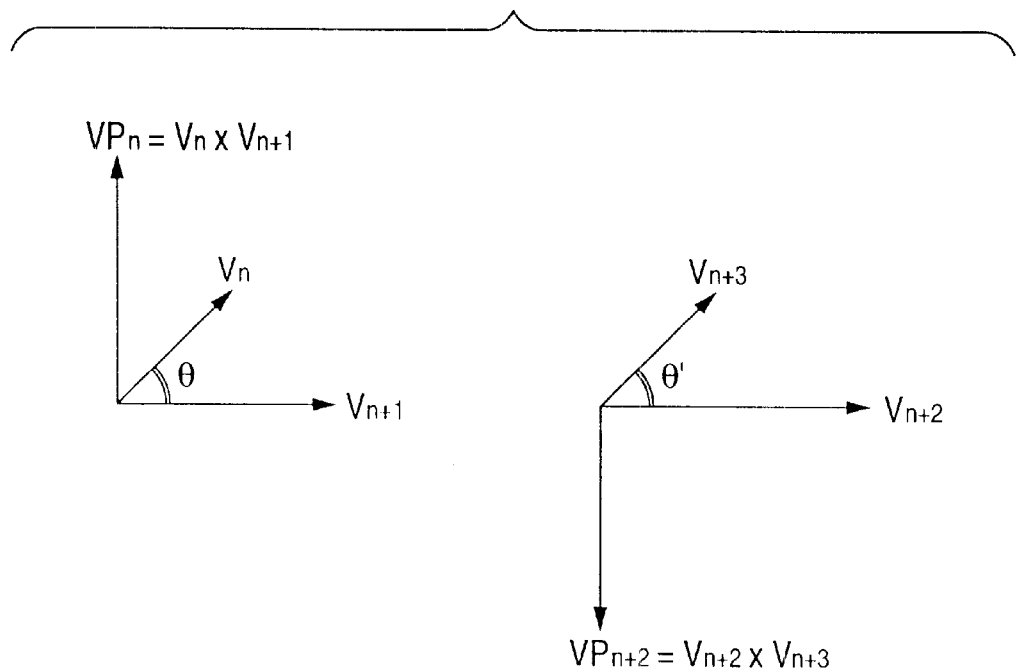

(a-2) An outer product of vectors located adjacent to each other on a vehicle travel path is calculated. For example, in FIG. 3B, a vector "VPn" denotes an outer product "Vn X Vn+1" between a vector "Vn" and another vector "Vn+1" (an angle defined between both vectors is selected to be "θ"). Another vector "VPn+2" shows an outer product "Vn+2× Vn+3" defined between a vector "Vn+2" and a vector "Vn+3" (an angle is selected to be "θ"). It should be noted that as to the outer products shown in this figure, a right hand system is employed.

(a-3) Since a direction (otherwise, positive/negative symbol) of an outer product is calculated, it is possible to judge as to whether or not a sort of a travel region corresponds to a region where a curved path is continued. In other words, it is possible to judge that such a place where a direction of an outer product (otherwise, symbol change of outer product) is frequently inverted along a vehicle travel path corresponds to a section where an S-shaped corner is continued.

Figure 4:
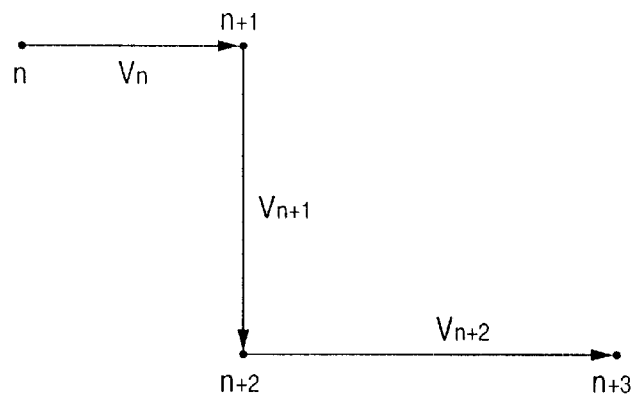
FIG. 4 is an explanatory diagram for explaining a method for judging a road where a crooked path is continued.

It should also be noted that this judging method as to either the crooked travel or the travel path where the crooked path is continued may be carried out by executing a vector calculation (outer product calculation) between nodes within a preselected distance section along a travel path. For instance, in an example of FIG. 4, with respect to a vector "Vn" directed from a node "n" to another node "n+1", a succeeding vector "Vn+1" is directed substantially perpendicular to the direction of the first-mentioned vector Vn. Further, another vector "Vn+2" subsequent to this vector "Vn+1" is directed substantially perpendicular to this vector "Vn+1". As a result, in the case of a crooked path, since an angle defined between vectors located adjacent to each other is substantially equal to 90 degrees (sin θ=1), a magnitude of an outer product is substantially equal to a product made from magnitudes of the respective vectors.

A sequence of the method (b) is described as in the below-mentioned (b-1) to (b-4).

(b-1) A positional coordinate (latitude and longitude) of each of nodes is calculated.

(b-2) Each of the positional coordinates is adapted to a spline curve (namely, a spline curve passing through the respective nodes is calculated).

(b-3) A total number of inflection points is counted which are located within a preselected section on a spline curve.

(b-4) A judgement is made as to whether or not a sort of a travel region corresponds to a region where a curved path is continued by comparing a total number of inflection points with a predetermined threshold value.

Next, a description will now be made of the method (II).

A detection subject (road signs, marks such as marks formed on roads) is exemplified as follows, which is used to judge a travel path by analyzing image information acquired by an imaging means such as a CCD camera.

(1). Lane Mark

A lane mark made on a road shoulder of a front travel path of the own vehicle, a center mark, a pedestrian crossing (crosswalk) etc.

(2). Road Signs and Other Traffic Devices

Road traffic signs and traffic devices installed on road shoulders.

(3). Landmark

Guide indications about entrance prefectures located at borders of prefectures, indications made on entrances/exits of toll roads such as superhighways, etc.

(4). Light Emitting Objects Existing on Roads

A tail light of a preceding-traveled vehicle, a head light of a vehicle traveled along counter direction, road illumination, lighting of shops and houses, etc.

It should also be noted that the below-mentioned methods may be involved in this method.

(II-a) A method of discriminating a city area, a suburb area, a superhighway, and the like.

(II-b) A method for judging a curved path where an S-shaped curve path is continued, or a road where a crank path is continued.

First, as to a lane mark (1), a photographed image of this lane mark is acquired by a real-time process operation to obtain shape data. For instance, it is possible to judge whether or not the vehicle is traveling over a section made of a continuous curved path in such a manner that a radius curvature as to a shape of a lane is calculated, and how many times a change in symbols of the calculated radius curvature occurs within a predetermined distance range, or a preselected travel time duration. In other words, in the case that the symbol change (namely, change in positive/negative symbols) of the radius curvatures of the lane within a predetermined travel distance range, or a preselected time duration exceeds a predetermined threshold value, it is judged that the travel path corresponds to a section where an S-shaped corner portion is continued (method (II-b)).

Also, in such a case that a total number of pedestrian crossings are located within either a predetermined travel distance range or a preselected travel time duration in a travel path is counted, and this counted number exceeds a threshold value, it is judged that a travel region corresponds to a city area (method (II-a)).

As to the road sign and the like defined in (2), since there are many road traffic signs installed on road shoulders in a city area and so on, a total number of road traffic signs which can be recognized by the imaging means is counted. Then, the travel region judging means 3 judges whether or not the travel region corresponds to a city area by checking as to whether or not the counted number exceeds a predetermined threshold value. For example, while a total number of signs through which the vehicle passes within either a preselected distance section or a predetermined travel time in a travel path, when this counted sign number exceeds a threshold value, the travel region judging means 3 judges that the travel region corresponds to the city area (method (II-a)).

Also, in such a case that a sign of a section where an S-shaped corner is continued, which is installed in a mountain road and the like, is imaged by the imaging means, the travel region judging means 3 judges that the travel region corresponds to a curved path travel region (method (II-b)). Thereafter, when a similar road traffic sign is again detected within a predetermined distance section or a preselected travel time duration, the travel region judging means 3 judges that the vehicle escapes from the curved travel region.

As to the landmark of (3), the travel region judging means 3 can judge that a time instant when this landmark is detected by the imaging means corresponds to either a starting point or an end point of a travel region equal to this landmark. For instance, a guide indication of a vehicle-entering-prefecture may be employed so as to discriminate a city area from an area other than the city area. Also, a starting point or an end point of a superhighway may be recognized based upon an entrance/exit of this superhighway.

The light emitting object of (4) may contribute an overall light amount in the case that a travel region is judged by detecting an environmental luminance brightness (otherwise, peripheral illuminance).

Figure 5:
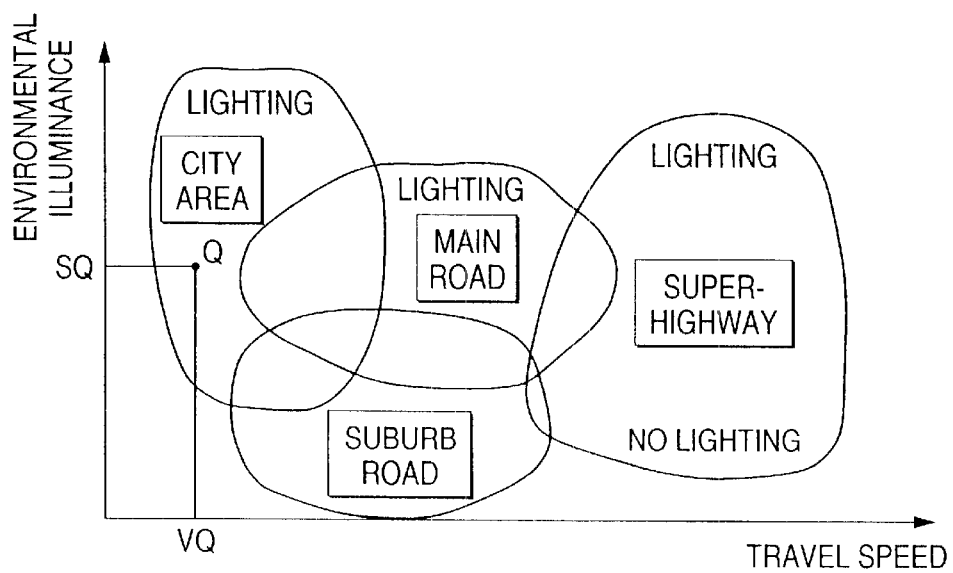
FIG. 5 shows a distribution diagram for indicating a relationship between a travel speed and environmental illuminance as to each of the travel regions.

FIG. 5 is a graphic representation that while an abscissa thereof indicates a travel speed (average velocity) and an ordinate thereof represents environmental luminance brightness, brightness distributions as to a road of a city area, a suburb road, a main road, a superhighway are compared with each other.

As illustrated in this graphic representation, in general, a travel speed is low and many road lighting facilities are provided in a city area. As a result, a brightness distribution range of this city area is located at an upper left position of this drawing. Also, in general, since a travel speed in a suburb road becomes higher than that of the city area, but a total number of road lighting facilities becomes small, a brightness distribution range of this suburb road is located at a position under a central position of this drawing. Also, since a traffic density in a main road is high and furthermore, a travel speed is relatively high, a brightness distribution range of this main road is located at a position above the central position of this drawing. Since a traffic amount is large and a travel speed is high in a superhighway, a brightness distribution range of this superhighway is located at a right-hand position of the drawing.

As can been seen from the brightness distribution, when the brightness of the city area where the travel speed is low is compared with the brightness of the suburb road where the travel speed is high, the brightness of the suburb area is darker than that of the city area. Then, when the brightness of the main road is compared with the brightness of the superhighway, the superhighway where no lighting facility is installed is darker than that of the main road.

In this case, the imaging means is employed as a means capable of not selectively imaging a specific detection subject, but capable of recognizing a brightness of a peripheral portion of a vehicle. For instance, while an image of a front road surface of a vehicle is acquired, a summation value or an average value is calculated with respect to signal output values of pixels located within a preselected travel distance range, or signal output values of pixels after a predetermined time duration has elapsed. The signal output values implies signal voltage values, or pixel values converted into a preselected gradation (256 gradations etc). Then, it is so judged that a position (position indicated by point "Q" (VQ, SQ) on FIG. 5) which is determined by both this summation/average value (environmental luminance brightness corresponding to this value is described as "SQ") and either a vehicle speed or an average speed (this speed is described as "VQ"). It should also be noted when the judgement is carried out, a relationship among the signal output value of the pixels, the vehicle speed range, and the travel region is expressed by way of a formula. Otherwise, this information may be previously stored into a storage means in a data table form, or a map data form.

Alternatively, a travel region may be further precisely judged by the travel region judging means 3 in such a manner that while light measurement data is acquired based upon a shutter speed, a diagram value, or an exposure value (EV value), measured by the imaging means, node data of a travel path and time information are acquired by the navigation apparatus 2a. In other words, in this alternative case, since the information about the daylight condition of the travel path and also the information about the outer light by artificial illumination (head lights of vehicles traveled along counter direction, road lights, shop lights, etc.) can be obtained based on the exposure condition information, the exposure information derived from the imaging means, and also the date and time information derived therefrom, the travel region judging means 3 can precisely execute the travel region judgement with reference to this acquired information and the road data (total link number and road sort, etc.) acquired from the navigation apparatus 2a.

As previously explained, in the case that while the brightness of the vehicle peripheral area is detected by the imaging means, the travel region judging means 3 judges whether or not the travel region corresponds to the city area based on the degree of light/dark condition. The travel region can be judged by executing a relatively simple image processing operation, and also a relatively simple data processing operation. As a consequence, since the road data acquired from the navigation apparatus is combined with the above information, the vehicle lighting member control apparatus of the present invention can perform such a lighting control operation equivalent to that for the suburb road traveling operation at a place where a traffic amount is small even in a city area (namely, place where glare lights containing road light and shop light are low). Alternatively, at such a place where a traffic amount is large even in a suburb path, the vehicle lighting member control apparatus of the present invention can perform such a lighting operation equivalent to that for the city area traveling operation. Furthermore, the judging precision of the travel path may be increased with reference to the vehicle speed information and the time instant information.

It should also be noted that since environmental luminance brightness of a front road surface is adversely influenced by weather, as to the luminance brightness measuring operation, it is preferable to detect a light amount with respect to a measurement range except for a front road surface of the vehicle. As to this environmental luminance-brightness of the front road surface, when a brightness in a fine day is compared with a brightness in a rainy day, the resulting brightness in the rainy day is lowered to approximately 1/10 of the brightness in the fine day. Conversely, a mirror reflection made on a wet road surface may increase luminance brightness.

In the above-explained embodiment, the information derived from the navigation apparatus 2a and also the information acquired from the imaging means 2b are employed as the information indicative of the travel environment. In addition to the above-explained information, when information obtained by detecting operation conditions is utilized, the travel area may be more correctly judged.

In other words, when the vehicle lighting member control apparatus of the present invention is arranged as follows, the frequency of the erroneous judgement related to the travel region may be reduced. That is to say, the travel region judging means 3 can judge whether or not the travel region corresponds to the city area based upon the information obtained from the detection means 7 (see FIG. 1) for detecting the driving conditions containing the change in either the steering angle or the yaw angle, a total number of braking operations, and the vehicle speed.

Figure 6:
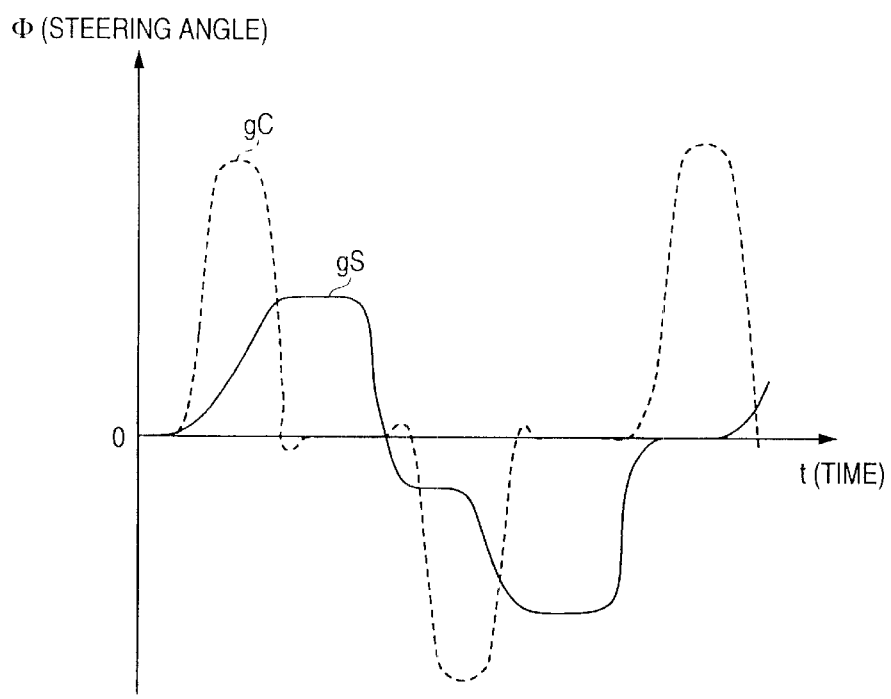
FIG. 6 is a graphic representation indicating an example of change of steering angle.
Figure 7:
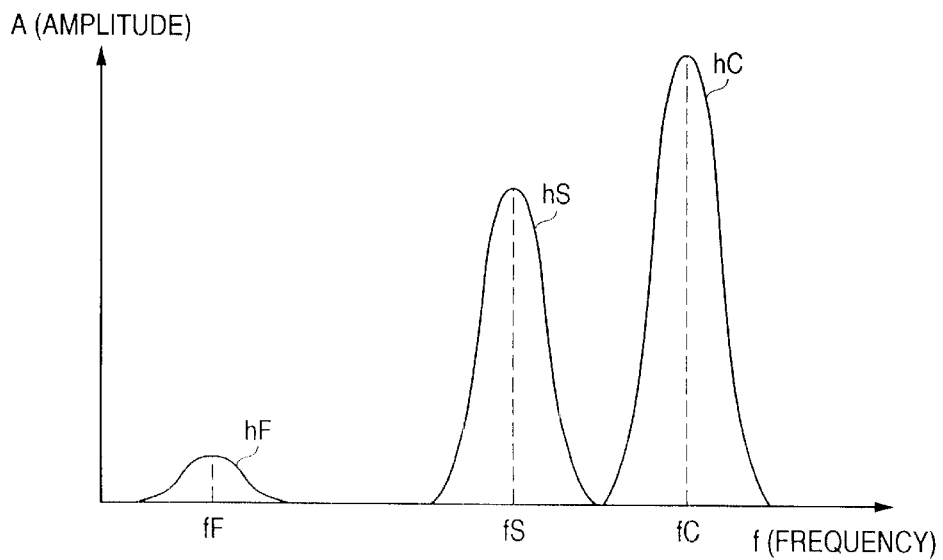
FIG. 7 is a graphic representation for schematically indicating an example of a frequency analysis result related to a detection signal of a steering angle.

FIG. 6 and FIG. 7 are explanatory diagrams for explaining a method for judging a travel region based upon detection information, and while a steering sensor for sensing a steering angle and a yaw rate sensor (lateral G sensor) for sensing a yaw angle are provided, the above detection information is obtained from sensor outputs of these sensors.

An abscissa of FIG. 6 shows a time "t", and an ordinate of FIG. 6 indicates a steering angle (otherwise yaw angle). In this graphic representation, a curve "gS" indicated by a solid line shows an angle change occurred when a vehicle is driven on an S-shaped corner, and another curve "gC" denoted by a broken line indicates an angle change occurred when a vehicle is traveled in a crooked path within a section where a crossroad is continued.

As apparent from these curves, a symbol of an angle "θ" is regularly inverted while the vehicle is traveled in a slalom path and a crooked path.

FIG. 7 shows an exemplification example for exemplifying a result obtained by that the angle "θ" is Fourier-transformed within a predetermined time duration. An abscissa of FIG. 720 shows a frequency "f", and an ordinate of FIG. 7 represents an amplitude "A". It should be understood that when the lane change by the vehicle is eliminated, the amplitude becomes the largest amplitude when the vehicle is traveled in the crooked path indicated by a curve "hC". When the vehicle is traveled in the slalom path indicated by a curve "hS", the amplitude becomes the second largest amplitude. When the vehicle is traveled in the superhighway indicated by a curve "hF", the amplitude becomes the smallest amplitude.

Also, as to a basic frequency (or central frequency), the basic frequencies are sequentially lowered in this order of the crank travel (fC), the slalom travel (fS), and the superhighway travel (fF).

Then, when the lane change is eliminated, as to the angle "Φ", it can be seen that the angle value becomes small while the vehicle is traveling on the superhighway, while the city road area is compared with the suburb road.

As previously explained, while the symbol inversion of the steering angle and the symbol inversion of the yaw angle are detected, a total number of direction inversions within a predetermined travel distance, or within a preselected travel time duration. Based upon the calculated direction inversions, or such information obtained by adding the vehicle speed information to these calculated direction inversions, it is possible to judge whether or not the vehicle is traveling on such a road where a curved path is continued. Also, it is possible to judge whether or not the vehicle is traveling in the curved path, or the crooked path, and also to judge the travel region based upon a frequency distribution characteristic (containing a relationship between a peak value of an amplitude and a central frequency) which is obtained from a frequency analysis (FFT etc.) related to the detection signal of the steering angle, or the yaw angle.

While an attention is paid to a relationship between a vehicle speed and a total number of braking operations, a city area, a suburb area, and a superhighway can be discriminated from each other.

Figure 8:
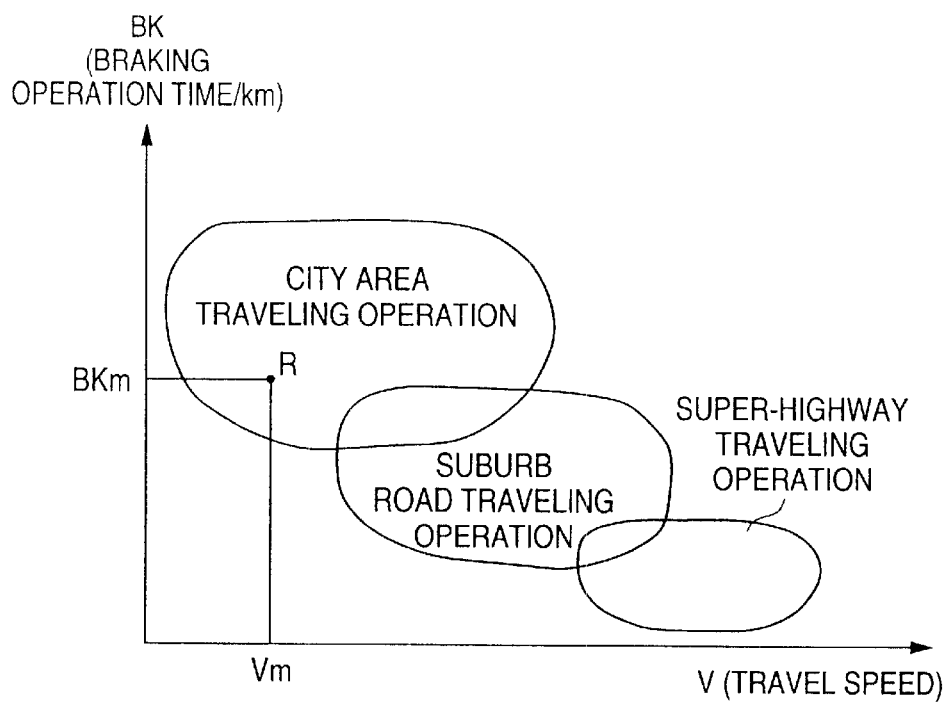
FIG. 8 is a distribution diagram for representing a relationship between a travel speed and a braking operation time with respect to each of the travel regions.

FIG. 8 schematically represents a relationship between a travel speed (average speed) "V" of a vehicle denoted in an abscissa and a braking operation time (BK (times/Km)) per unit time denoted in an ordinate.

While a vehicle is traveled in a city area, a travel speed of this vehicle is low and also a total braking operation times (number of times) BK per a travel distance is increased due to the following reason. That is, in the city area, a traffic amount is large, and also there are many crossings and many traffic signals. As a result, this range of the city area traveling operation is distributed at an upper left position of this drawing.

When the vehicle is traveled in a suburb road, since a traffic amount is decreased, a total brake operating time BK per a travel distance becomes smaller than that for the city area travel. However, a travel speed V is increased. It should also be noted that since there are various types of roads such as a narrow road and a curved road in the suburb area, the distribution range occupies a relatively wide area.

While a vehicle is traveling on a superhighway road, since a travel speed V becomes the highest travel speed and also there are no crossings, a total braking operation time BK per a travel distances becomes the smallest braking operation time, and a range thereof occupies a narrow area, and is distributed in a lower right portion of this drawing.

As previously explained, the average speed of the vehicle (this speed is indicated as "Vm") is calculated based upon the information acquired from the vehicle speed sensor and the like. Moreover, the operation time (otherwise, averaged operation time which is indicated as "BKm") acquired from the sensor for detecting the braking operation is detected. Then, it is possible to judge that a place determined from both the average speed information and the operation time information (namely, position indicated by point "R" (Vm, BKm) in FIG. 8) belongs to which travel region.

It should also be noted that even when the sensor for detecting the braking operation is replaced by another sensor for detecting an accelerator pedal operation, a similar judgement may be carried out.

Also, the detections of the drive operation condition may involve the drive operation in response to the road shape by detecting the steering angle and the yaw rate, and also the drive operation caused by the vehicle driver such as the detections of the steering angle, the vehicle speed, the braking operation, and the accelerator pedal operation (it may be interpreted that detection of steering angle is caused by drive operation in response to road shape, and further, by drive operation of vehicle driver).

The lighting control means 4 (see FIG. 1) is provided so as to perform the lighting control operation of the vehicle lighting member 6 in response to the judgement signal derived from the travel region judging means 3. This lighting control means 4 supplies a control signal to the selecting/driving means 5 provided at the post stage thereof.

Major three irradiation light beams are given as follows among irradiation light beams selected in response to the travel regions judged by the travel region judging means 3: It should be noted that a line "H—H" shows a horizontal line, and a line "V—V" indicates a vertical line in FIG. 10, FIG. 12, and FIG. 14, respectively.

Figure 9:
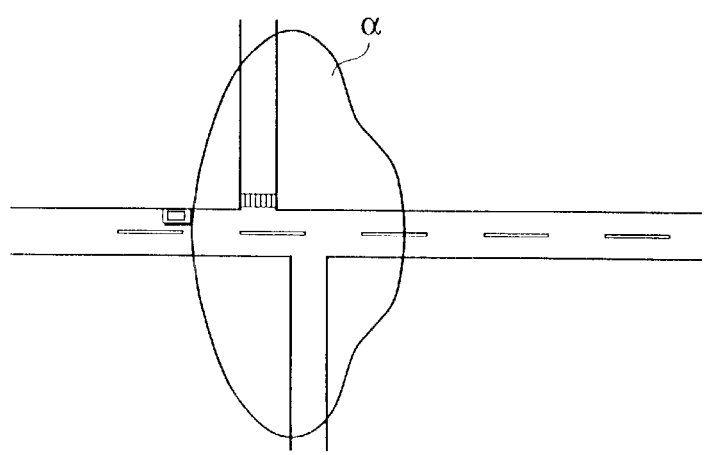
FIG. 9 is an explanatory diagram for explaining a city area traveling light beam, and corresponds to a schematic diagram of an irradiation range, as viewed in a plane.
Figure 10:
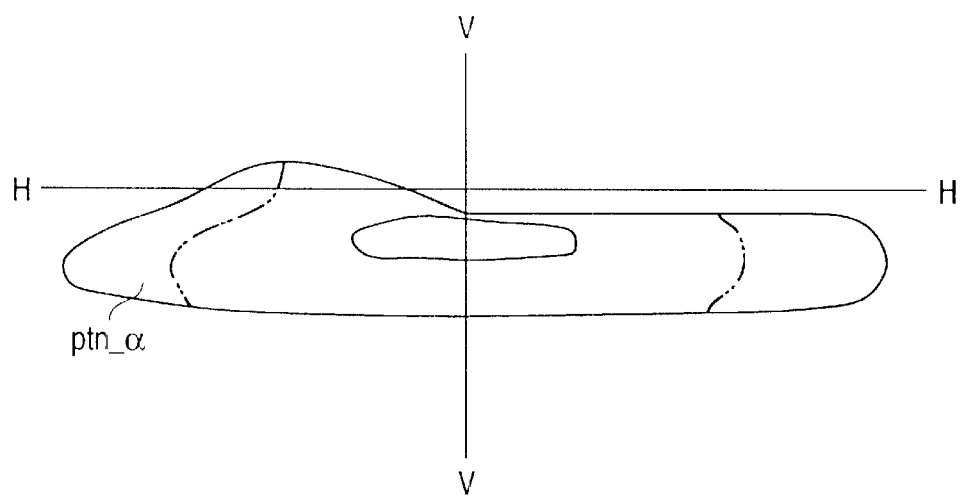
FIG. 10 is a diagram for schematically indicating a light distribution pattern of the light beams shown in FIG. 9.

(1) A light beam for a city area traveling operation (see FIG. 9 and FIG. 10).

Figure 11:
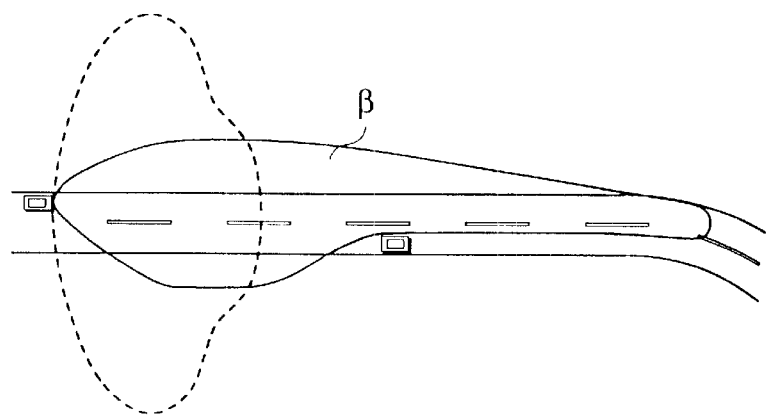
FIG. 11 is an explanatory diagram for explaining a suburb road traveling light beam, and corresponds to a schematic diagram of an irradiation range, as viewed in a plane.
Figure 12:
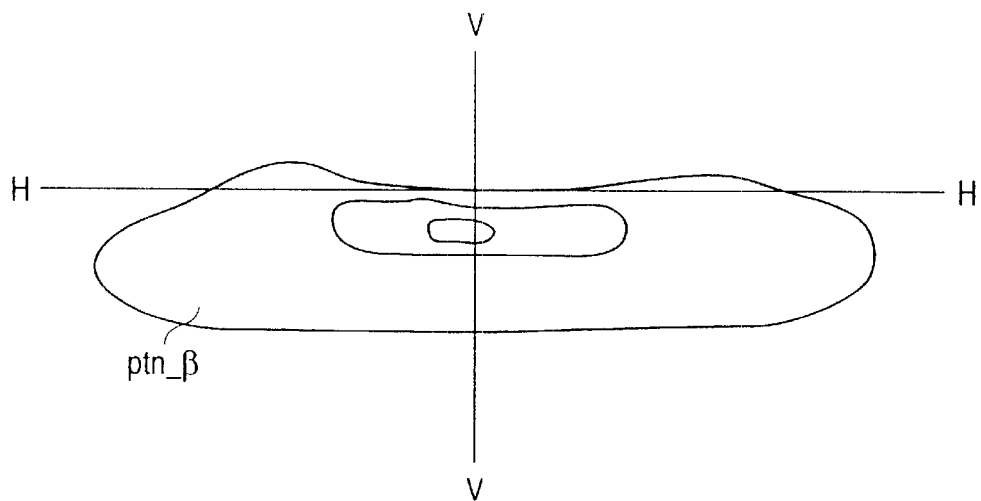
FIG. 12 is a diagram for schematically indicating a light distribution pattern of the light beams shown in FIG. 11.

(2) A light beam for a suburb road traveling operation (see FIG. 11 and FIG. 12).

Figure 13:
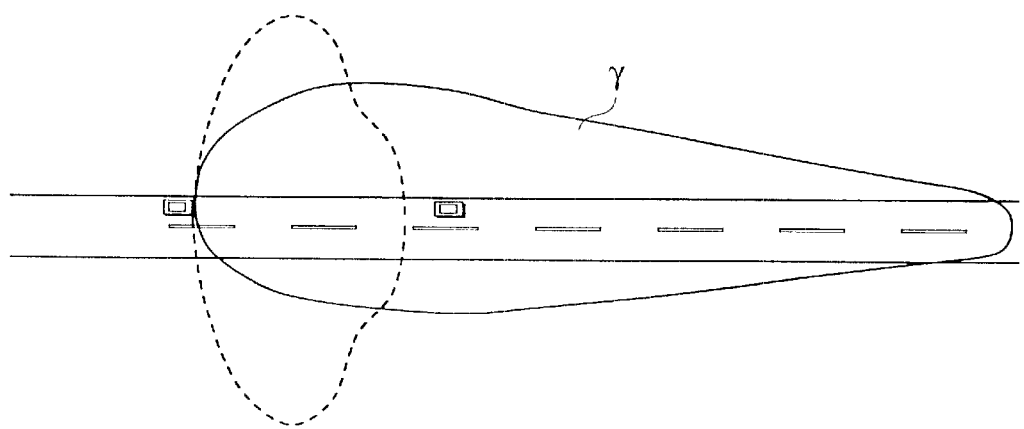
FIG. 13 is an explanatory diagram for explaining a superhighway road traveling light bean, and corresponds to a schematic diagram of an irradiation range, as viewed in a plane.
Figure 14:
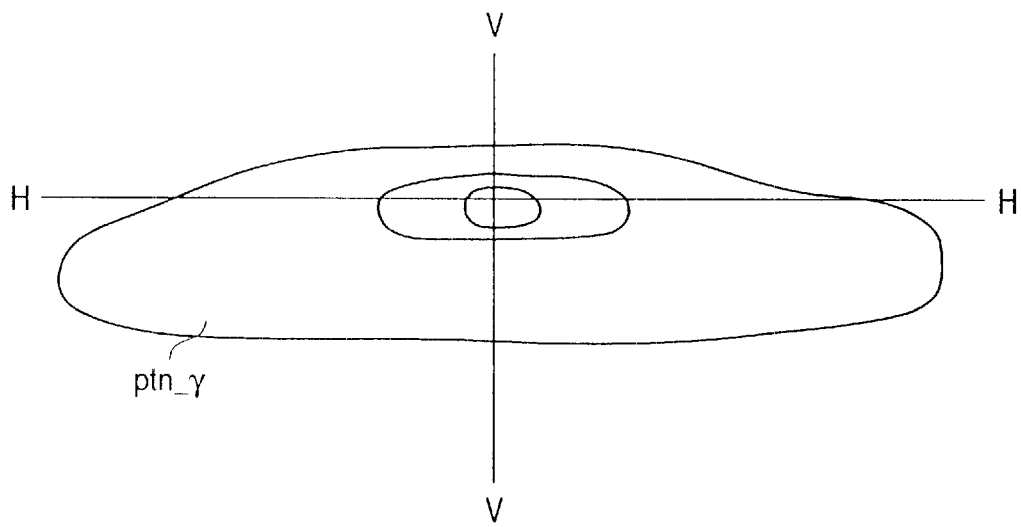
FIG. 14 is a diagram for schematically indicating a light distribution pattern of the light beams shown in FIG. 13.

(3) A light beam for a superhighway traveling operation (see FIG. 13 and FIG. 14).

As to the city area traveling light beam, as indicated by a range "α" shown by a solid line in FIG. 9, diffusion lighting operation is desirably widely carried out toward the side direction in order to safety-travel the vehicle on a road near the city area and a crossing near the city area, where there are many pedestrians.

In such a case that a light distribution pattern "ptn_α" schematically indicated in FIG. 10 is compared with a pattern made by a present low beam (or, counter beam) indicated by a broken line, it can been seen that the diffused light along the right side direction and the diffused light along the left side direction are increased.

The suburb road traveling light beam corresponds to such a light beam for lighting a road where a gentle curved path is present and a small number of persons appear. As indicated as a range "β" shown by a solid line of FIG. 11, this suburb road traveling light beam can light a front area of the vehicle from a medium distance to a far distance. As can be understood from a light distribution pattern "ptn_β" schematically shown in FIG. 12, this suburb road traveling light beam owns a portion slightly extended toward an upper right direction from the horizontal line H—H.

The superhighway road light beam corresponds to a light beam whose lighting performance with respect to a far distance of a front range of the vehicle, by which the vehicle can be driven safely in high speeds on a superhighway road having a center separating area and an anti-glaring frame (refer to range "γ" denoted by solid line of FIG. 13). In other words, as can been seen from a light distribution pattern "ptny" schematically indicated in FIG. 14, a light amount of a luminous intensity center portion where a portion near a cross point between the horizontal line H—H and the vertical line V—V is used as a center is increased.

As to the lighting member 6 controlled by the lighting control means 4, there are provided two types of lighting members, namely a multi-light type lighting member and a beam movable type lighting member.

Figure 15:
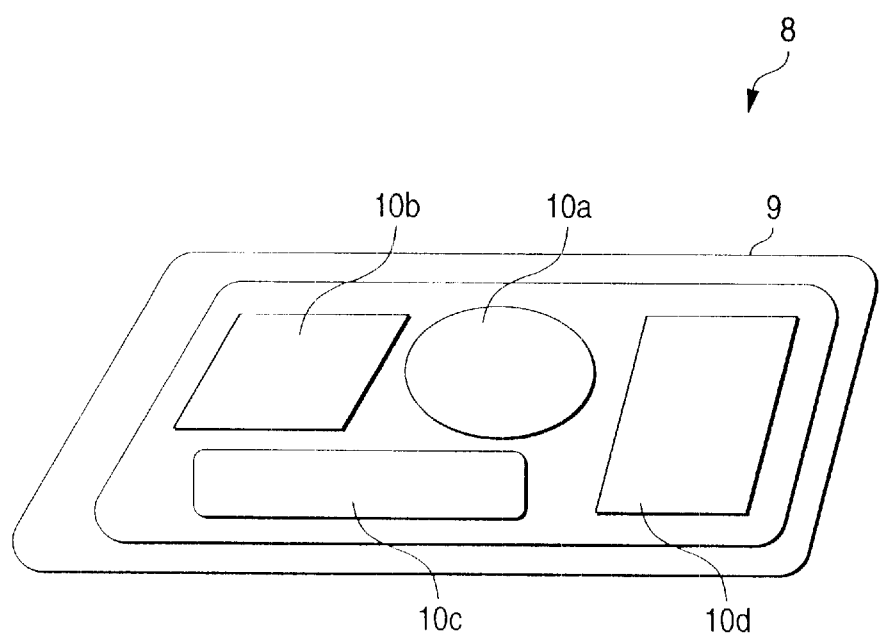
FIG. 15 is a diagram for schematically indicating a structural example of a multi-light type lighting member.

FIG. 15 schematically represents a structural example 8 with respect to a multi-light type head lamp which is arranged by a plurality of lamp units positioned in a lamp body 9. There are two methods, namely, one method for providing a light source as to each of the lamp units, and another method for commonly using a single light source among a plurality of lamp units.

A lamp unit 10a located near a center portion is employed so as to form a cut-off (or, cut-off line) in counter light beam. This lamp unit 10a is constituted by, for instance, a light source, a parabola-ellipse composite surface reflection mirror, and a lens portion positioned in front of this reflection mirror.

A lamp unit 10b for lighting a side scene is arranged on the left side of the lamp unit 10a, whereas a lamp unit 10c for lighting a far scene is arranged under both this lamp unit 10b and the lamp unit 10a.

Then, a lamp unit 10d with a wide diffusion lighting function is arranged on the right side of the lamp unit 10a.

In this lighting member, while the respective lamp units 10a to 10d are selectively turned ON, these lighting lights are combined with each other, so that such a light beam suitable for a traveling region can be irradiated. In other words, only such a lamp unit which is selected via the selecting/driving means 5 by the lighting control means 4 is turned ON. For example, when the city area traveling beam is irradiated, the lamp unit 10b for lighting the side scene is turned ON, and when the superhighway road lighting beam is irradiated, the lamp unit 10c for lighting the far scene is turned ON.

Figure 16:
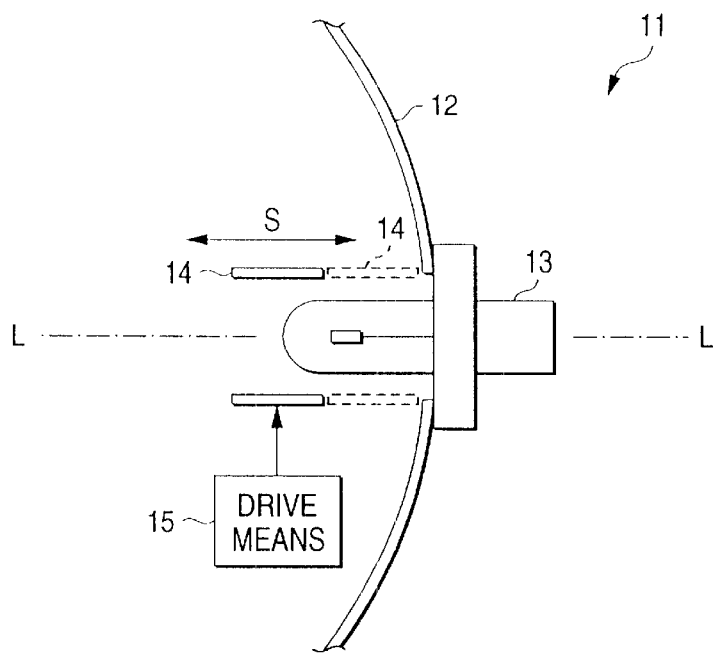
FIG. 16 is a diagram for schematically showing a structural example of a beam variable type lighting member together with FIG. 17, and schematically representing a drive mechanism of a shade.
Figure 17:
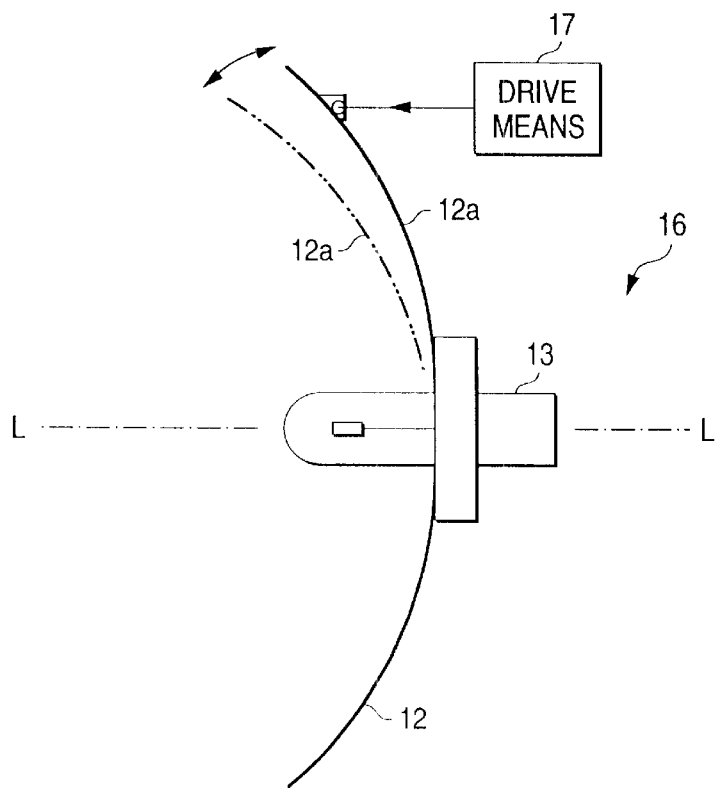
FIG. 17 is a diagram for schematically showing a drive operation of a variable reflection mirror.

FIG. 16 and FIG. 17 schematically represent a structural example of a beam movable type lighting member.

FIG. 16 schematically shows a mechanism 11 capable of variably-controlling a light distribution by moving a shade. Precisely speaking, a shade 14 for covering from a front side a light source 13 mounted on a reflection mirror 12 is supported under such a condition that this shade 14 is movable along an optical axis "L—L" of the reflection mirror 12. Then, the driving structure of the shade 14 is arranged as follows: That is, the positions of the shade 14 along the front/rear direction (namely, optical axis direction) of the shade 14 may be defined by way of a drive means 15 such as an actuator, or a solenoid using a motor. In this drawing, the shade 14 is arranged in such a manner that this shade 14 can be slid in either the continuous manner or the stepwise manner along a direction parallel to an optical axis "L—L" as indicated by an arrow "S" in FIG. 14. Alternatively, a mechanism capable of pivoting (inclining) this shade 14 may be additionally provided, namely, such a structure capable of controlling the attitude of this shade 14 may be employed.

As a consequence, a portion of light which is directed from the light source 13 to the reflection plane of the reflection mirror 12 can be shaded by this shade 14 in response to the position of the shade 14. As a result, while only the reflection light of the desirable region on the reflection surface is intentionally used, the light distribution can be defined.

FIG. 17 schematically indicates a structural example 16 used to control an inclination of the reflection mirror 12 within a horizontal plane involving an optical axis. A portion of the reflection mirror 12 is constituted as a movable reflection mirror 12a. Since this movable reflection mirror 12a is driven by a drive means 17 such as an actuator, or a solenoid using a motor, the direction of reflection light derived from the movable reflection mirror 12a may be controlled. As a consequence, for instance, when a vehicle is traveled in a curved path, the movable reflection mirror 12a is driven, so that the light beam may be controlled to be irradiated to such a direction along which the vehicle is bent.

It should be noted that the lighting range and the lighting control direction are not limited to the above-explained structures, but may be realized by the following methods. That is, a position of an inner lens provided in a lighting member may be changed; a shape/height of a shade may be changed; and/or a light source position may be shifted along an optical axis direction, namely various sorts of embodiment modes may be realized.

FIG. 18 to FIG. 31 represent an embodiment of a lighting control apparatus for an automobile lighting member, to which the present invention is applied.

Figure 18:
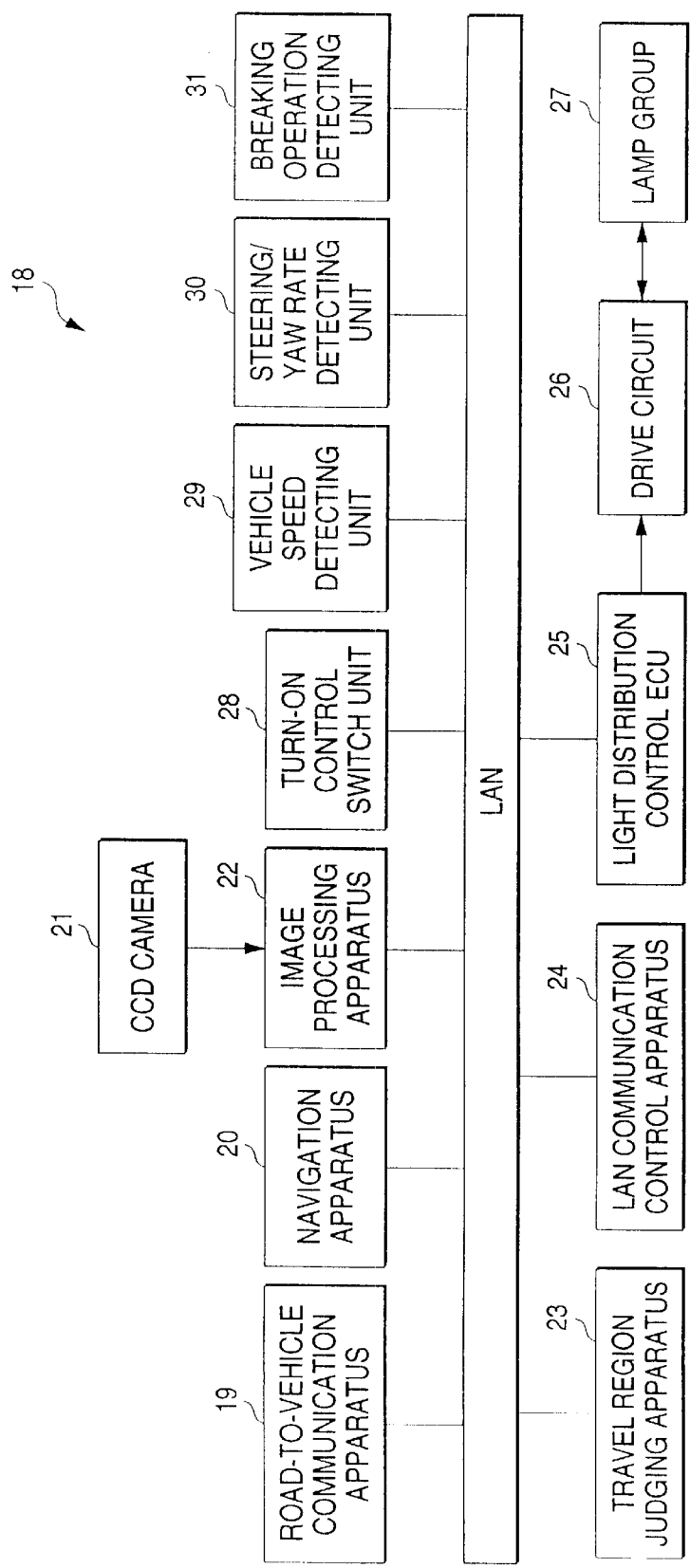
FIG. 18 is an explanatory diagram for explaining an example of the present invention, namely indicates an apparatus example using a LAN.

FIG. 18 shows an apparatus example 18 in which an on-vehicle LAN (Local Area Network) is constituted as a main frame, and the below-mentioned structural elements are provided (Arabic numerals appeared in blanks indicate reference numerals). For the sake of simple illustrations, all of possible structural elements are connected to the on-vehicle LAN in a combination manner.

A road-to-vehicle communication apparatus (19).
A navigation apparatus (20).
ACCD camera (21) and an image processing apparatus (22).
A travel region judging apparatus (23).
A LAN communication control apparatus (24).
A lighting distribution control ECU (25).
A drive circuit (26).
A lamp group (27).
A turn-ON control switch unit (28).
A vehicle speed detecting unit (30) containing a vehicle speed sensor.
A steering angle, or yaw rate detecting unit (30).
A braking detection unit (31) containing a brake switch.

It should also be noted that symbol "CCD" indicates a charge-coupled device, and symbol "ECU" shows an electronic control unit.

As the navigation apparatus 20, there are two cases of the GPS system and also of the road-to-vehicle communication system. In the case of the road-to-vehicle communication-system, while information derived from a beacon provided on a road side belt is received by the road-to-vehicle communication apparatus 19, both a present position of a vehicle and a search route are added to road map information based upon this received information in the navigation apparatus 20 so as to display an image. It should also be noted that the lighting control apparatus of this embodiment shown in this drawing is arranged such that the road-to-vehicle communication apparatus 19 transmits/receives information via the on-vehicle LAN to/from 5 the navigation apparatus 20. Alternatively, the road-to-vehicle communication apparatus 19 may be directly connected to the navigation apparatus 20.

The travel region judging apparatus 23 receives information derived from the navigation apparatus 20 and the image processing apparatus 22 so as to judge that the vehicle is now traveling in which travel region. It should also be noted that this travel region judging apparatus 23 may be built in either the navigation apparatus 20 or the lighting distribution control ECU 25, although this travel region judging apparatus 23 is connected to the on-vehicle LAN.

The turn-ON control switch unit (column lighting switch) 28 is provided in order to select an irradiation beam, and/or instruct a control content of the irradiation beam. As to the beam control, both an automatic beam control mode and a manual beam control mode are prepared. For example, in the case that a vehicle driver selects the automatic beam control mode, the lighting control (see FIG. 9 to FIG. 14) of the light beam is automatically selected in response to the judgement result made by the travel region judging apparatus 23. Also, when the vehicle driver selects the manual beam control mode, for example, the city area traveling light beam, the suburb road traveling light beam, and the superhighway traveling light beam may be selected in accordance with the willing of the vehicle driver.

The lighting control ECU 25 sends out a control signal to the drive circuit 26 in response to an instruction issued from the travel region judging apparatus 23 and/or an instruction issued from the turn-ON control switch unit 28 in order that the lamp group 27 is selectively turned ON, the irradiation direction of the light beam is switched, and both the light distribution control and the light beam are switched. When the light beam is switched, a light control (light amount control) may be carried out, if necessary.

The lamp group 27 involves head lamps, fog lamps, cornering lamps, and the like, which are mounted on right/left portions of a vehicle front portion.

As a sensor used in the vehicle speed detecting unit 29, the previously provided sensor may be employed, for example, sensors used in an ABS (Anti-skid Brake System) system. Also, a steering sensor is provided on a steering handle in order to sense a steering angle, whereas as a yaw rate sensor, a sensor (lateral G sensor) capable of sensing a gravity acceleration speed along a lateral direction is employed. The brake switch is provided so as to detect a total number of braking operation by a vehicle driver.

Next, an example of a control operation executed in the vehicle lighting control apparatus according to the embodiment will now be explained.

Figure 19:
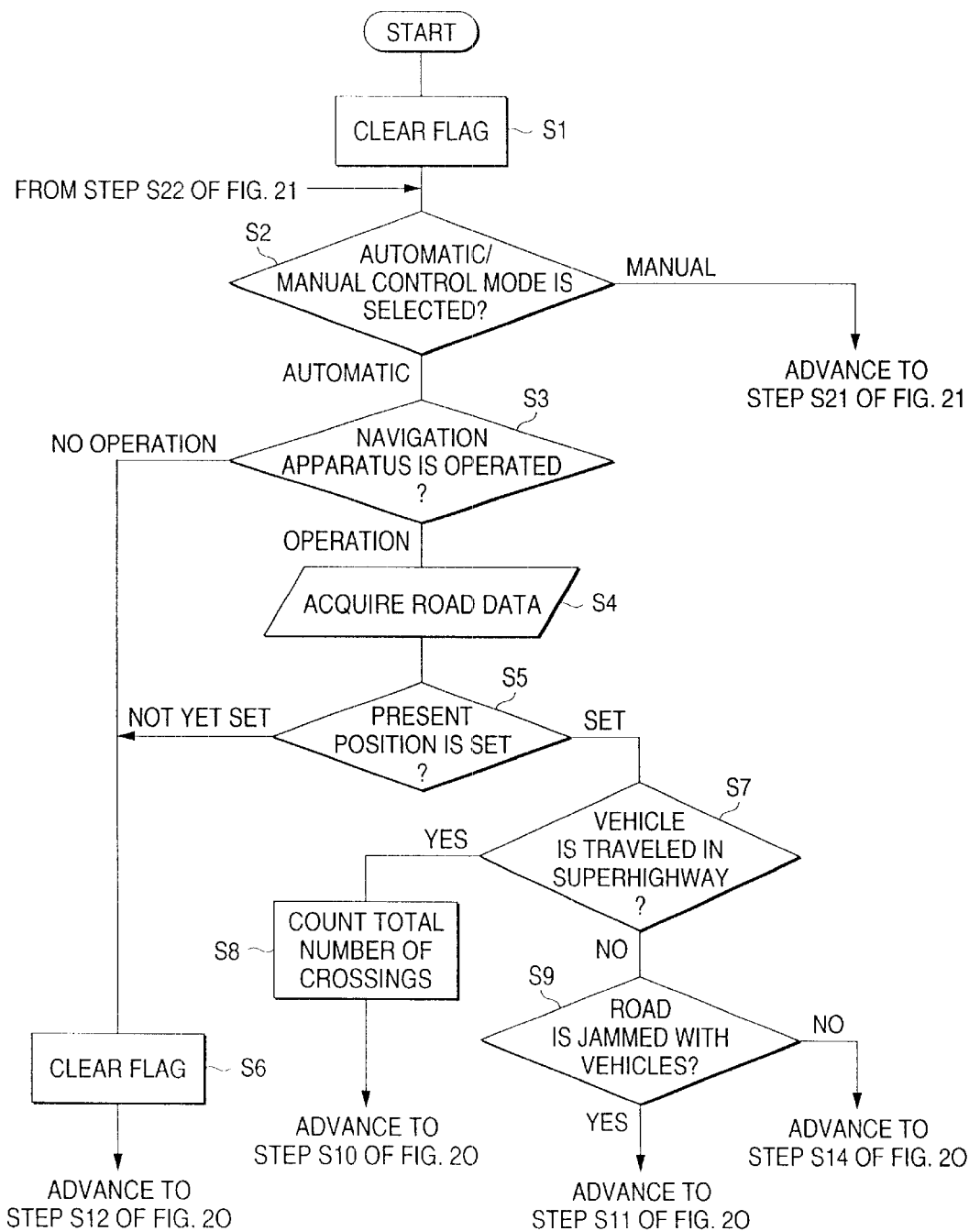
FIG. 19 is a flow chart for describing a control example in such a case that a travel region is judged by analyzing a node together with FIG. 20 and FIG. 21, and this flow chart shows a beginning portion of the entire process operation.
Figure 20:
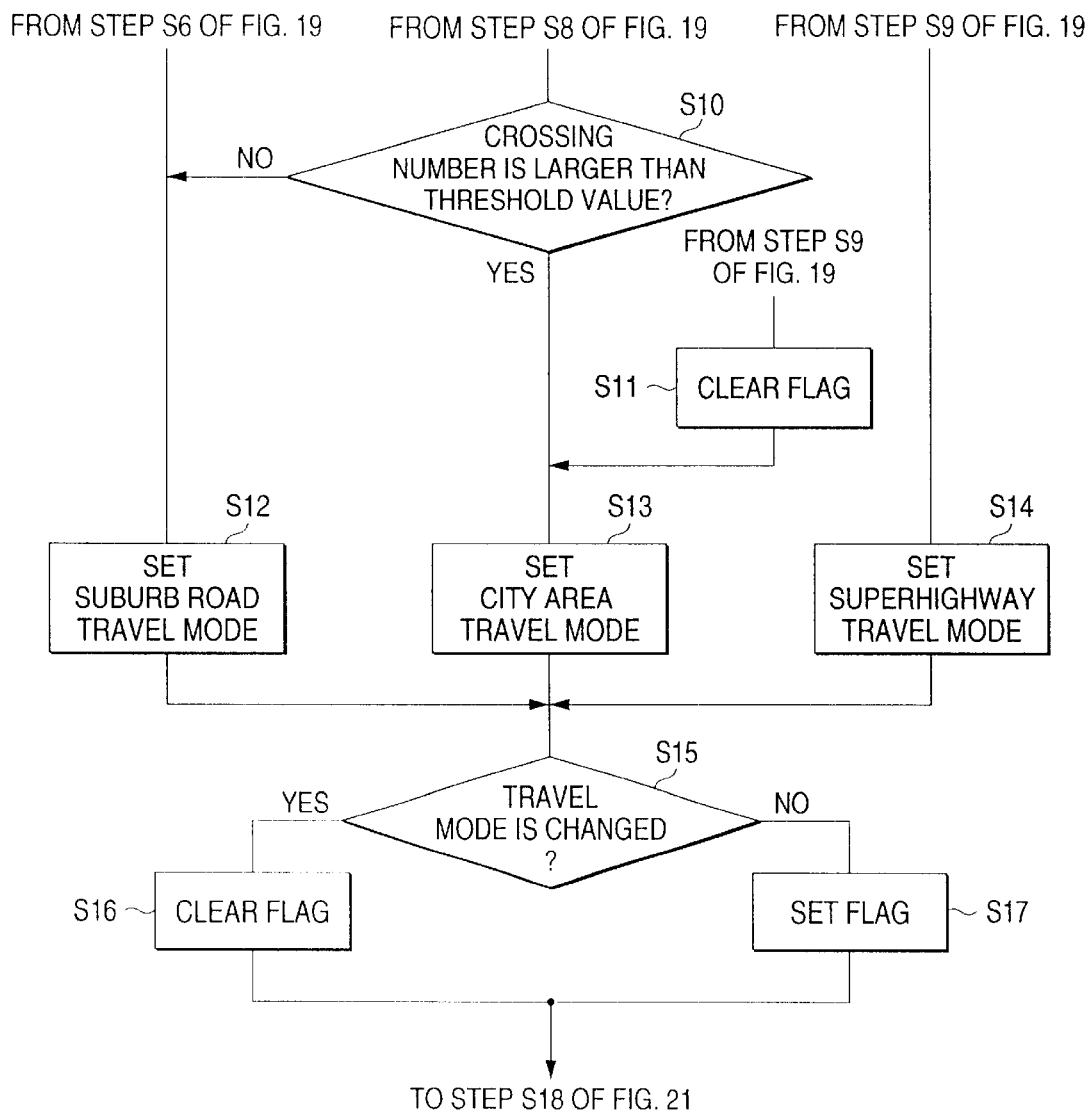
FIG. 20 is a flow chart for describing a medium portion of the above-explained process operation of FIG. 19.
Figure 21:
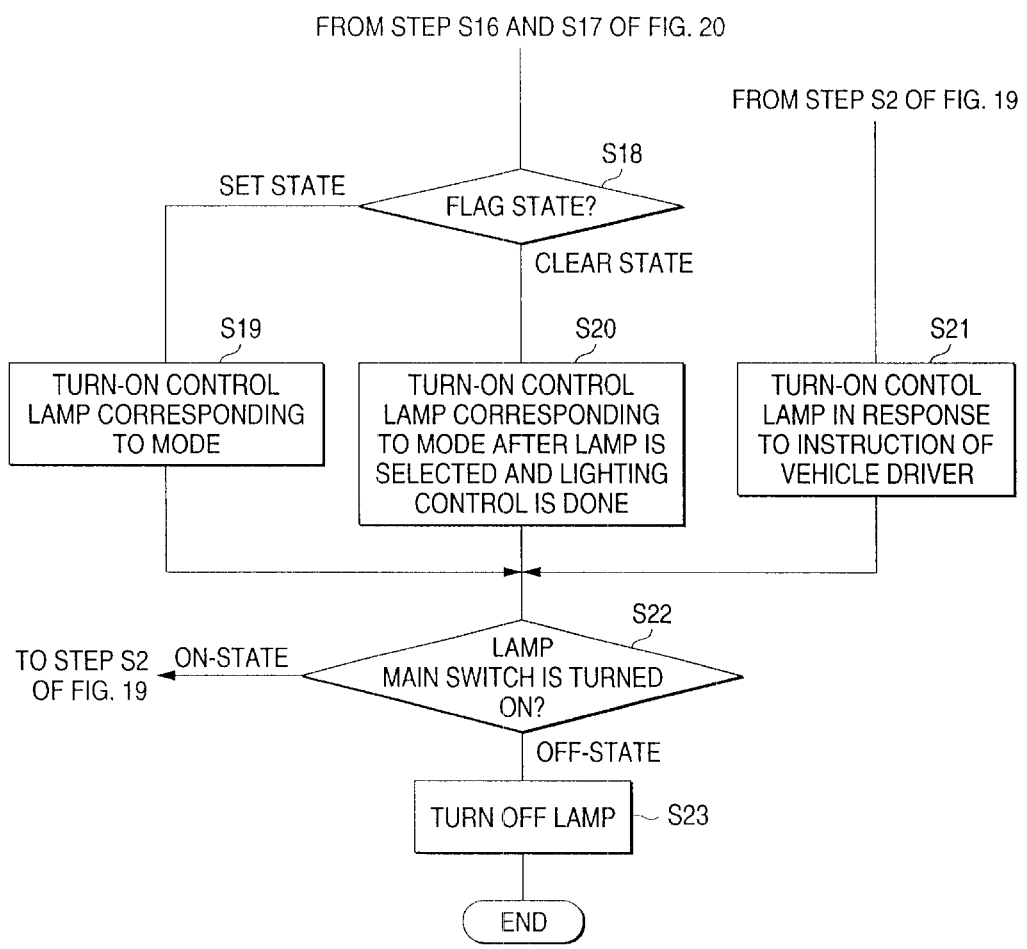
FIG. 21 is a flow chart for describing an end portion of the above-explained process operation of FIG. 19.

FIG. 19 to FIG. 21 shows a control example in such a case that as the travel environmental information acquired from the navigation apparatus using the road-to-vehicle communication system, the travel region is judged based upon analyzed node data of a travel path. As a consequence, in this case, the various types of information acquired from the CCD camera 21, the image processing apparatus 22, and the various sorts of sensors (except for vehicle speed sensor) are no longer required.

At a first step S1, a flag is cleared. It should be noted that this flag is used to determine as to whether or not a light control operation is carried out when an irradiation beam is switched, or an irradiation range is changed. When this flag is cleared, it is so set that the light control operation is carried out.

At the next step S2, a check is made as to whether the turn-ON control switch unit 28 selects the automatic lighting control mode, or the manual lighting control mode. When the automatic lighting control mode is selected, the process operation is advanced to a further step S3, whereas when the manual lighting control mode is selected, the process operation is advanced to a step S21 shown in FIG. 21.

At this step S3, another check is done as to whether or not the navigation apparatus 20 is operated. When the navigation apparatus 20 is operated, the process operation is advanced to a next step S4 at which road data is acquired. To the contrary, when the navigation apparatus 20 is not operated, the process operation is advanced to a step S6 at which the flag is cleared and thereafter the process operation is advanced to a step S12 of FIG. 20.

At a step S5, a judgment is made as to whether or not the setting state of the present position of the vehicle is made. When the present position has been set, the preparing operation for the travel region judgement has been set. Thus, the process operation is advanced to a step S6 at which the flag is cleared. Thereafter, the process operation is advanced to a step S12 shown in FIG. 20.

At the step S7, a check is made as to whether or not the vehicle is traveling on a superhighway road. When the vehicle is traveling on the superhighway road, the process operation is advanced to a step 59. Conversely, when the vehicle is not traveling on the superhighway road, the process operation is advanced to a step S8 at which a total number of crossings appeared within a preselected distance range is calculated. Thereafter, the process operation is advanced to a step S10 shown in FIG. 20.

At the step S9, a judgment is made as to whether or not the travel path is jammed with vehicles based upon the information derived from the road-to-vehicle communication apparatus 19. When the travel path is jammed with vehicles, the process operation is advanced to a further step S11 of FIG. 20 at which the flag is cleared. Thereafter, the process operation is advanced to a step S13. To the contrary, when the travel path is not jammed with the vehicles, the process operation is advanced to a step S14 of FIG. 20. At this step S14, the present control mode is advanced to such a control mode (superhighway travel mode) in which the vehicle is traveling, while irradiating the superhighway road traveling beam (see FIG. 13 and FIG. 14).

At the step S10, a check is made as to whether or not the total number of crossings appearing within a predetermined distance range (or, preselected travel time) in the travel path of the vehicle is larger than, or equal to a threshold value. When the total value of these crossings is higher than, or equal to the threshold value, the process operation is advanced to a step S13. Conversely, when the total value of the crossings is smaller than the threshold value, the process operation is advanced to a step S12.

At the step S13, the present control mode is advanced to a control mode (city area travel mode) in which the vehicle is traveling, while the city area traveling beam (see FIG. 9 and FIG. 10) is irradiated.

At the step S12, the present control mode is advanced to a control mode (suburb road travel mode) in which the vehicle is traveling, while the suburb road traveling beam (see FIG. 11 and FIG. 12) is irradiated.

At the step S15 subsequent to the steps S12 through S14, a check is made as to whether or not the present travel mode is switched by comparing the past travel mode with the present travel mode. In the case that the past travel mode is made coincident with the present travel mode, the process operation is advanced to a step S17 at which the flag is set. To the contrary, in the case that the past travel mode is different from the present travel mode, the process operation is advanced to a further step S16 at which the flag is cleared.

At the step S18 of FIG. 21, the state of the flag is checked. When the flag is set to a clear state, the process operation is advanced to a step S20 at which a lamp whose light control is required is selected. Thereafter, the lamps are completely turned ON, which are required to irradiate the light beam of the travel mode after the light control operation of this lamp has been controlled.

When it is so judged at the step S18 that the flag is brought into the set condition, the process operation is advanced to a step S19. At this step S19, while no light control of the lamp is carried out, only the lamps required to irradiate the light beams corresponding to the travel mode are turned ON.

When the process operation is reached to the step S21, the manual light control mode is selected at the step S2 of FIG. 19. At this time, the lamps are turned ON which are required to irradiate the light beams and which are adapted to the travel mode designated by the vehicle driver.

Then, at a step S22 subsequent to the steps S19 to S21, a check is made as to whether or not the main switch for turning ON the head lamp in the turn-ON control switch unit 28 is brought into the ON state. When this main switch is brought into the ON state, the process operation is returned to the previous step S2 of FIG. 19. Conversely, when the main switch is brought into the OFF state, the process operation is advanced to a further step S23. At this step S23, the lamp is turned OFF, and thereafter, the lighting control operation is ended.

In the above-described control example, the information is utilized which is mainly acquired from the navigation apparatus. In such a case that the light distribution control operation is carried out in response to the information related to the steering angle and also the vehicle speed, for instance, the below-mentioned control mode may be employed as the control mode in the case that the above-explained beam variable type lighting member is used.

Navigation interconnection mode:

That is, in the case that the travel path of the vehicle is set in the navigation apparatus (navigation interconnection mode), the irradiation control of the light beam is carried out based upon the above-explained road data. On the other hand, when it is so recognized that a continuous section of an S-shaped corner and a crooked portion is present due to a landmark, such a control mode is employed in such a control manner that the beam irradiation direction is fixed to the side direction.

Navigation non-interconnection mode:

Further, in the case that the travel path of the vehicle is not set in the navigation apparatus (navigation non-interconnection mode), or in the case that the vehicle is traveled out of the set travel path, such a control mode is employed in such a control manner that the beam irradiation direction can be fitted to the traveling direction of the vehicle in response to the detection information related to the steering angle and the vehicle speed.

Figure 22:
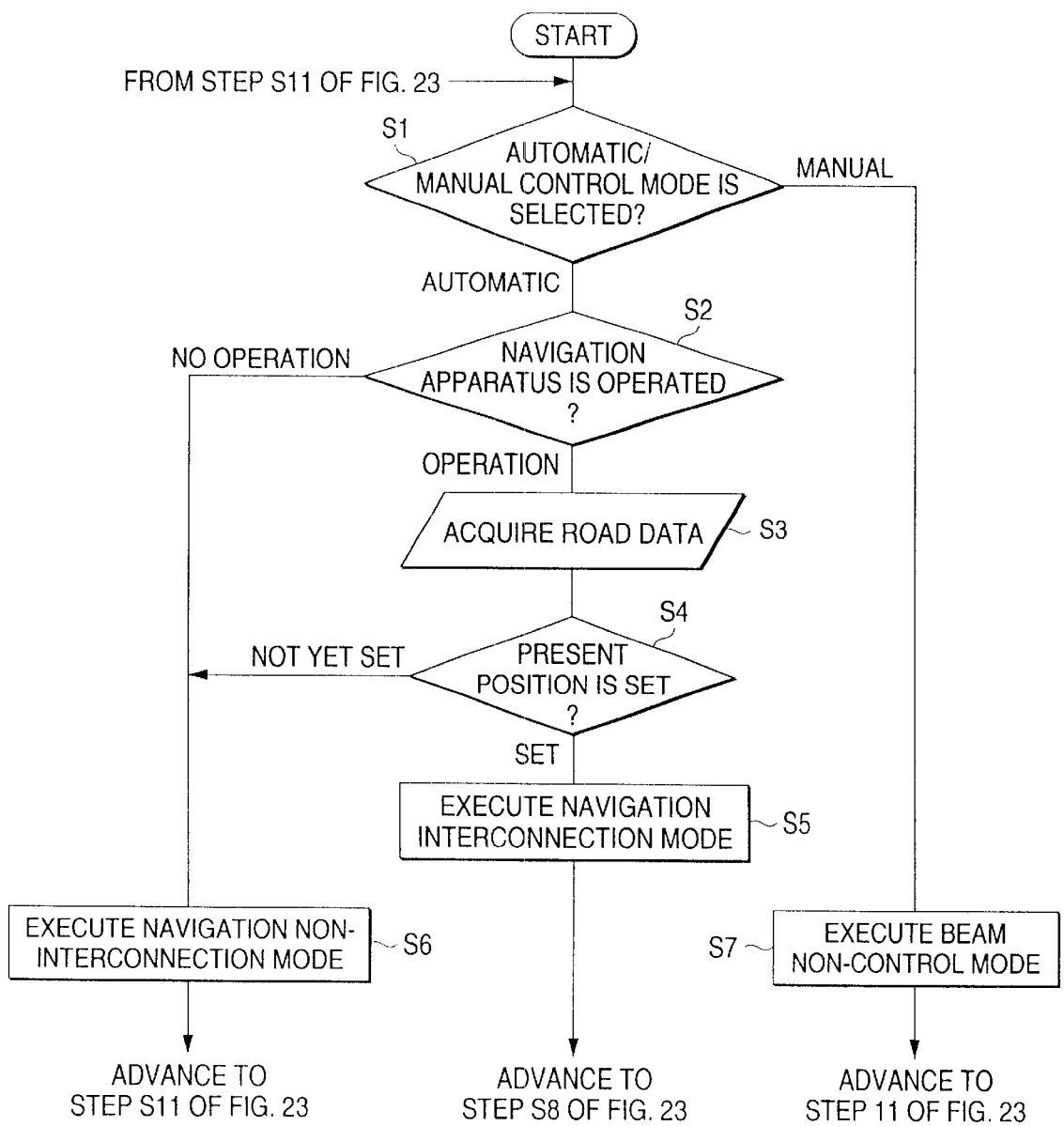
FIG. 22 is a flow chart for describing a control example executed by utilizing a steering angle, a vehicle speed, and a landmark together with FIG. 23, namely this flow chart shows a front half process operation thereof.
Figure 23:
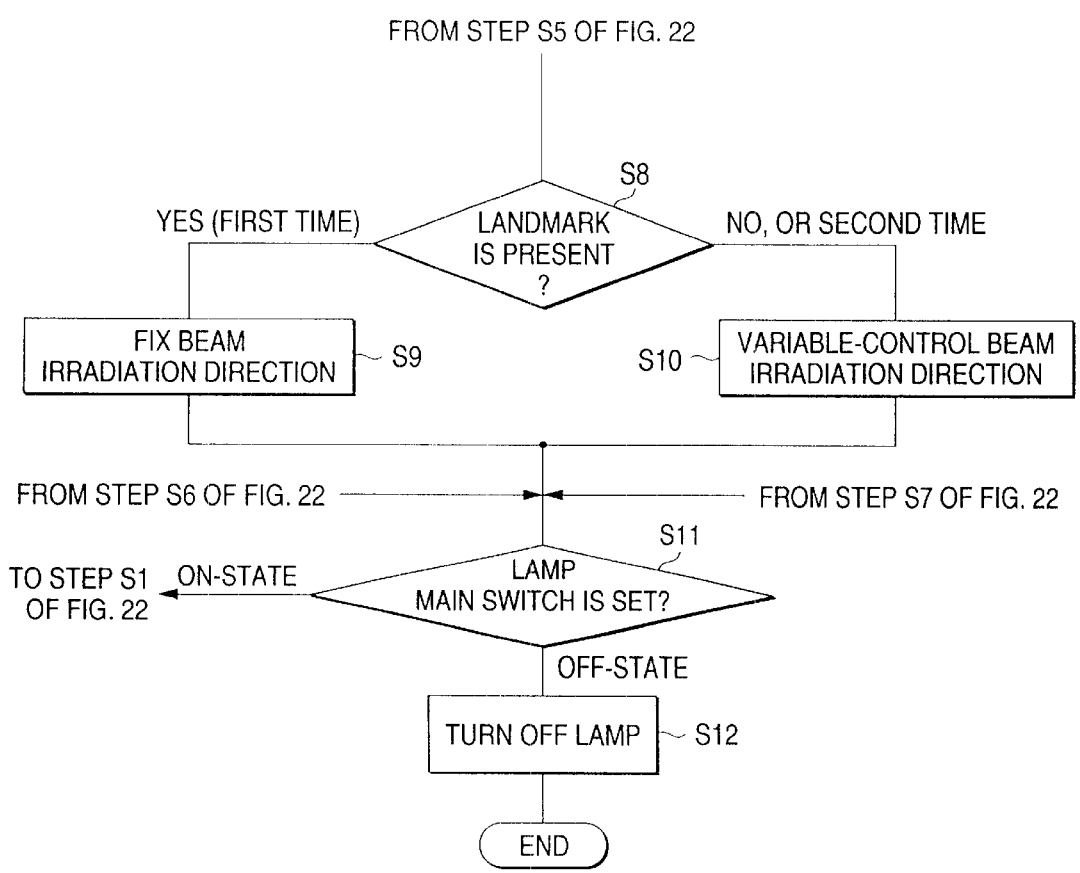
FIG. 23 is a flowchart for describing a rear half process operation of the above-described process operation shown in FIG. 22.

FIG. 22 and FIG. 23 are flow charts for describing an example of such a control operation.

At a first step S1, a check is made as to whether the switching operation in the turn-ON control switch unit 28 selects the automatic lighting control mode, or the manual lighting control mode. When the automatic lighting control mode is selected, the process operation is advanced to a further step S2, whereas when the manual lighting control mode is selected, the process operation is advanced to a step S7. At this step S7, the present control mode is advanced to such a control mode (namely, beam non-control mode) that abeam irradiation direction is not controlled. There after, the process operation is advanced to a step S11 shown in FIG. 23.

At this step S2, another check is done as to whether or not the navigation apparatus 20 is operated. When the navigation apparatus 20 is operated, the process operation is advanced to a next step S3 at which road data is acquired. To the contrary, when the navigation apparatus 20 is not operated, the process operation is advanced to a step S6 at which the operation mode is advanced to the navigation non-interconnection mode and thereafter the process operation is advanced to a step S11 of FIG. 23.

At a step S4, a judgment is made as to whether or not the setting state of the present position of the vehicle is made. When the present position has been set, the process operation is advanced to a step S5 at which the present operation mode is advanced to the navigation interconnection mode. To the contrary, when the present position is not yet set, the process operation is advanced to a step S6. At this step S6, the present operation mode is advanced to the navigation non-interconnection mode.

At a step S8 shown in FIG. 23 subsequent to the step S5, a check is made as to whether or not a landmark is firstly detected.

Figure 24:
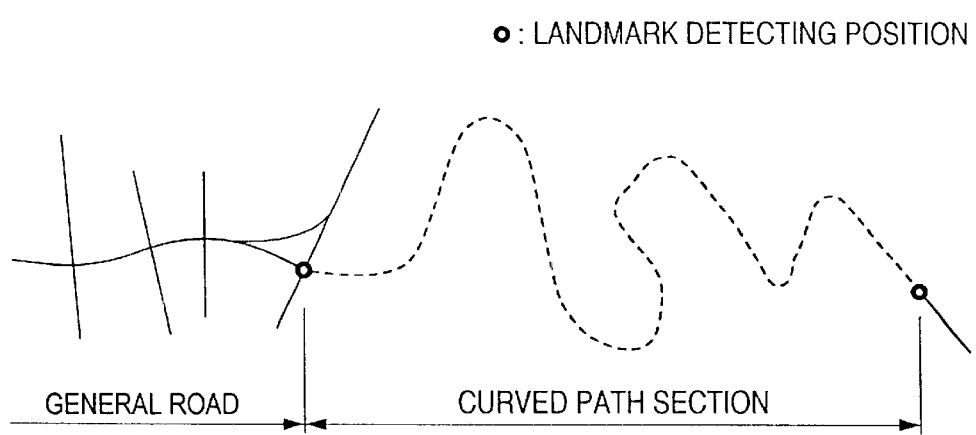
FIG. 24 is a diagram for schematically indicating an example of a road shape.

FIG. 24 schematically shows an example of a road shape. In this road shape, a detection position of a landmark is indicated by a circular mark under such a condition that a vehicle is advanced from a section denoted by a wide solid line, in which a radius curvature is small, to another section of a curved path denoted by a broken line.

As indicated in this drawing, since the landmark is 15 detected at the entrance/exit of the curved path, in the case that this landmark is recognized at first time, the process operation is advanced to a step S9 of FIG. 23. At this step S9, the vehicle is traveled in the road where the S-shaped corner and the crooked portion are continued under such a condition that the beam irradiation direction is fixed to the side direction.

When there is no landmark, or the landmark is recognized at second time (end of corner), the process operation is advanced to a step S10 of FIG. 23. At this step S10, the beam irradiation is controlled based upon the road data.

Then, at a step S11 subsequent to the steps S9 to S10, a check is made as to whether or not the main switch for turning ON the head lamp in the turn-ON control switch unit 28 is brought into the ON state. When this main switch is brought into the ON state, the process operation is returned to the previous step S1 of FIG. 22. Conversely, when the main switch is brought into the OFF state, the process operation is advanced to a further step S12. At this step S12, the lamp is turned OFF, and thereafter, the lighting control operation is ended.

Figure 25:
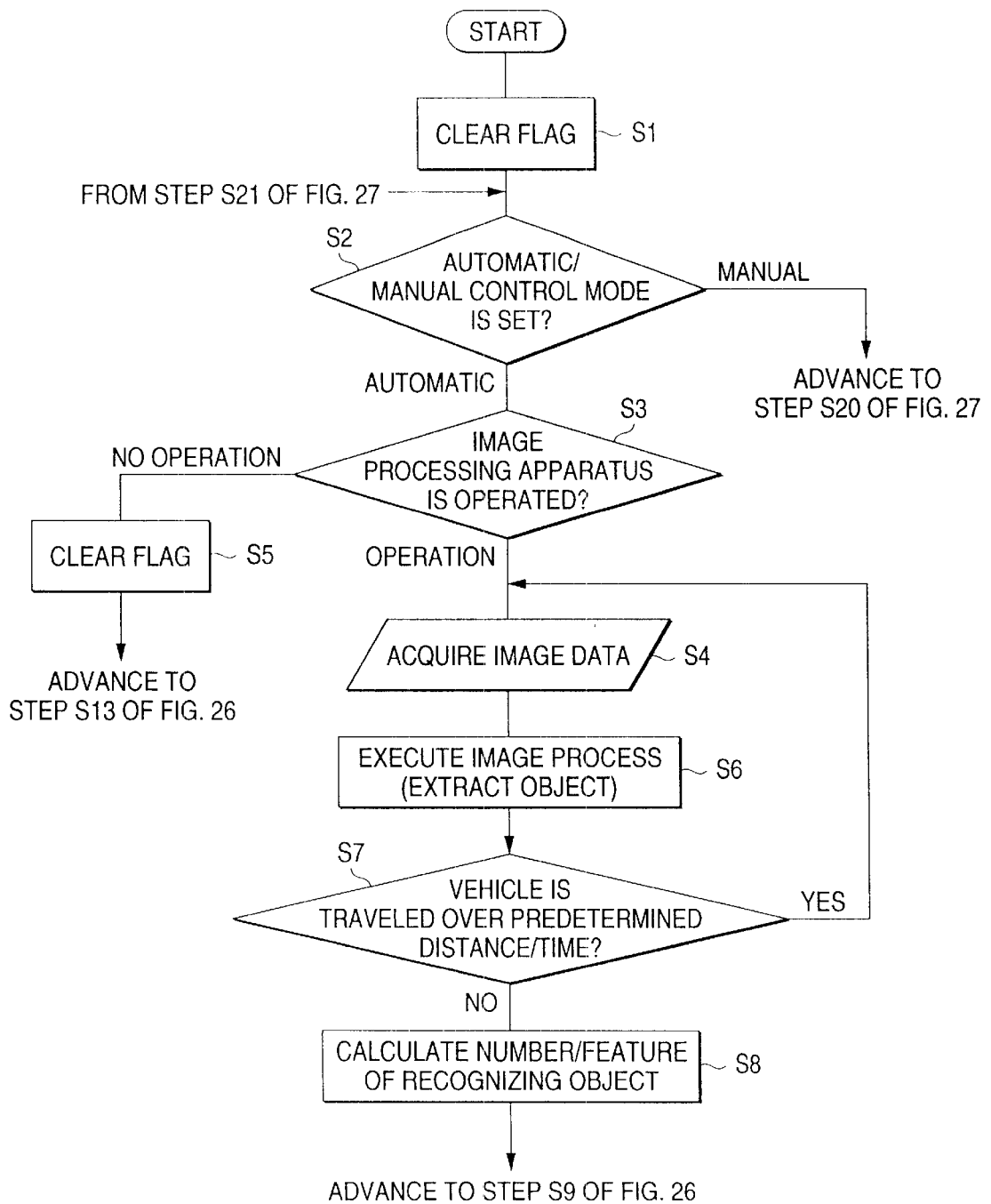
FIG. 25 is a flow chart for describing a control example in such a case that a travel region is judged by analyzing an image with FIG. 26 and FIG. 27, and this flow chart shows a beginning portion of the entire process operation.
Figure 26:
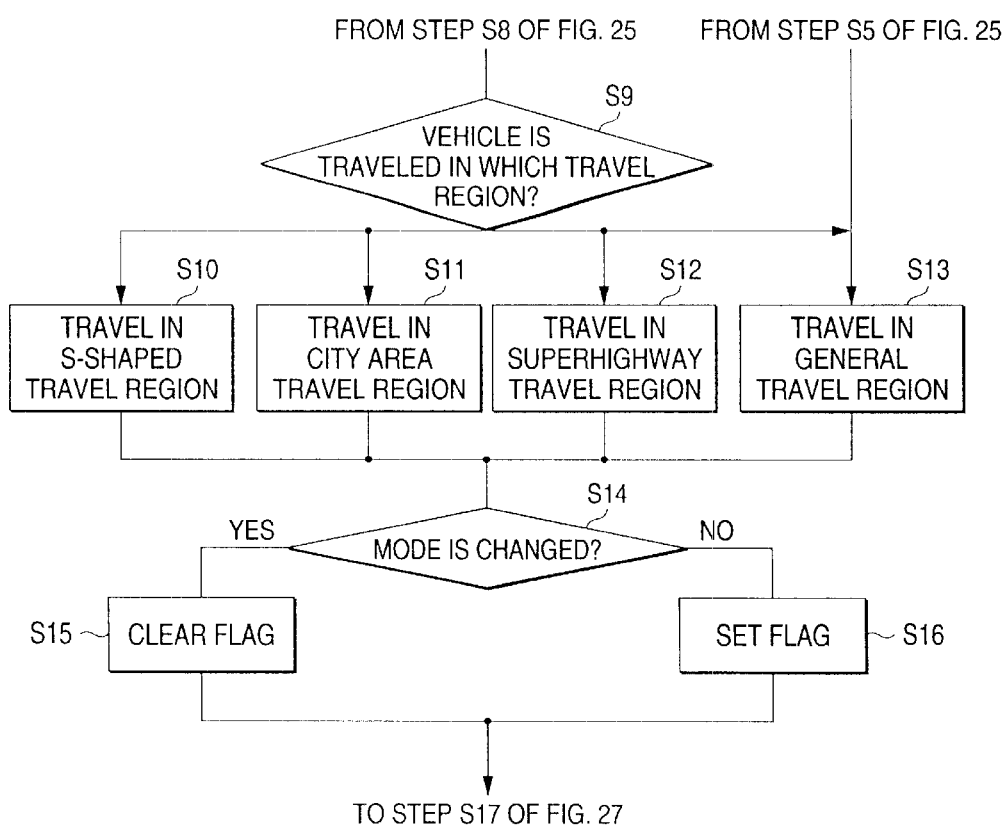
FIG. 26 is a flow chart for describing a medium portion of the above-explained process operation of FIG. 25.
Figure 27:
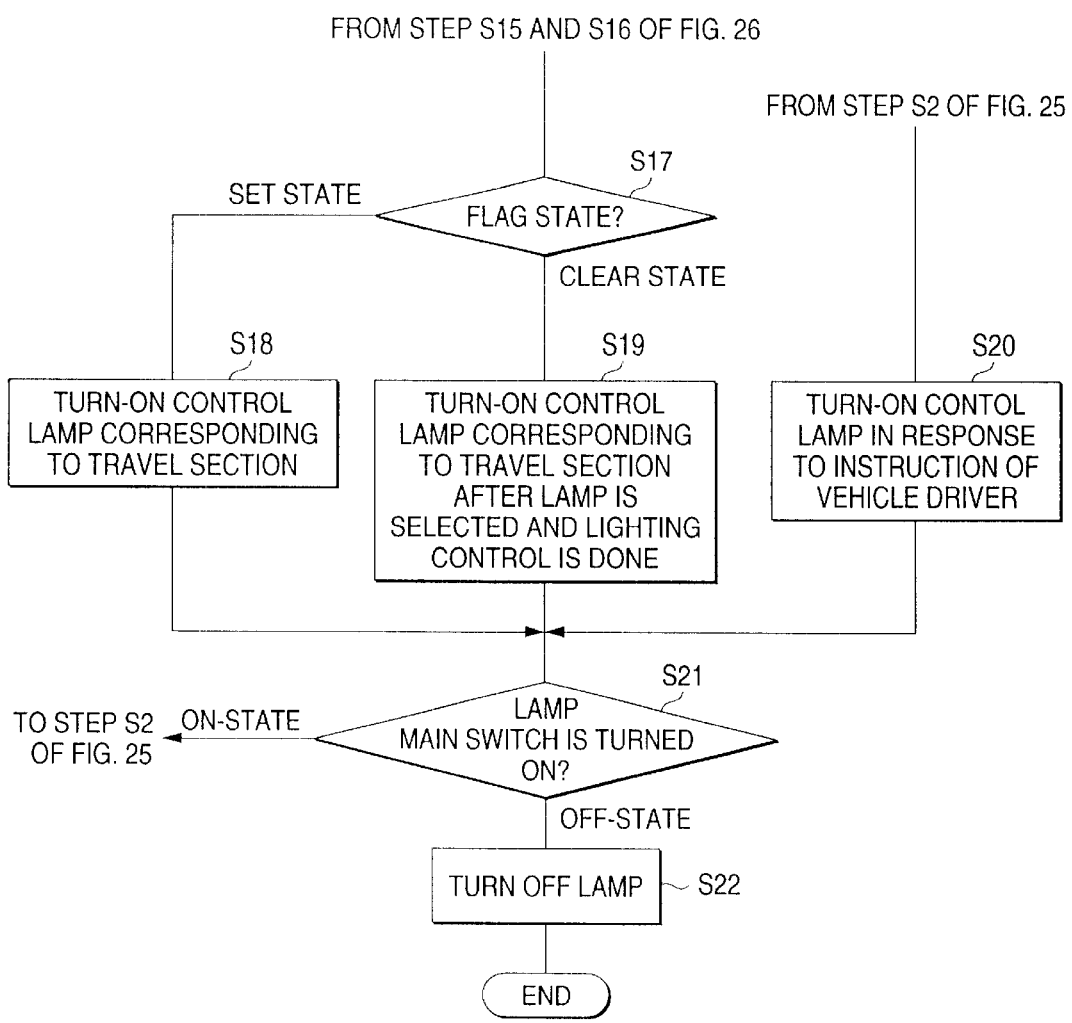
FIG. 27 is a flow chart for describing an end portion of the above-explained process operation of FIG. 25.

Referring now to flow charts shown in FIG. 25 to FIG. 27, a description is made of such a control example that a travel region is judged based upon travel environmental information acquired by employing both the CCD camera 21 and the image processing apparatus 22.

First, at a step S1 of FIG. 25, a flag for defining as to whether or not a light control operation is required is cleared. Thereafter, at the next step S2, a check is made as to whether the turn-ON control switch unit 28 selects the automatic lighting control mode, or the manual lighting control mode. When the automatic lighting control mode is selected, the process operation is advanced to a further step S3, whereas when the manual lighting control mode is selected, the process operation is advanced to a step S20 shown in FIG. 27.

At this step S3, another check is done as to whether or not the image processing apparatus 22 is operated. When the image processing apparatus 22 is operated, the process operation is advanced to a next step S4 at which image data is acquired. To the contrary, when the image processing apparatus 22 is not operated, the process operation is advanced to a step S5 at which the flag is cleared and thereafter the process operation is advanced to a step S13 of FIG. 26.

At a step S6 subsequent to the step S4, the image processing apparatus 22 executes the image process operation in order to extract an object to be recognized (lane mark and sign), and then discriminates a shape feature of this recognizing object, and also counts a total number thereof. It should be understood that when the object is extracted, the known image processing method such as the edge processing method (contour extraction) and the filtering method may be employed.

Then, at the next step S7, a judgement is made as to whether or not the vehicle is traveled over a predetermined travel distance section, or for a preselected travel time duration. When the vehicle is not yet traveled over either the predetermined travel distance section or the preselected travel time duration, the process operation is returned to the step S4. To the contrary, when the vehicle has been traveled, the process operation is advanced to a next step S8. At this step S8, the image processing apparatus 22 recognizes the shape of the object to be recognized (radius curvature of lane) within either this travel distance section or the travel time duration, and also totalizes a total number of the objects to be recognized (total number of pedestrian crossings).

At a step S9 of FIG. 26, a travel region is judged, and then, the process operation is branched to four sub-routines as defined from a step S10 to a step S13 in this control example.

At the step S10, it is so judged that the present travel path corresponds to an S-shaped travel section, and is such a travel path where an S-shaped corner is continued.

At the step S11, it is so judged that the present travel section corresponds to a city area travel section. At the step S12, it is so judged that the present travel section corresponds to a superhighway travel section. It should be noted that a normal travel section shown in the step S13 implies sections other than the S-shaped travel section, the city area travel section, and the superhighway travel section. In this general travel section, the present low light beam is distributed.

At a step S14 subsequent to the step S10 through the step S13, a check is made as to whether or not the travel section is switched by comparing the past travel section with the present travel section. Then, in the case that the past travel section is made coincident with the present travel section, the process operation is advanced to a step S16. At this step S16, a flag is set. When the past travel section is not made coincident with the present travel section, the process operation is advanced to a step S15 at which the flag is cleared.

At the step S17 of FIG. 27, the state of the flag is checked. When the flag is set to a clear state, the process operation is advanced to a step S19 at which a lamp whose light control is required is selected. Thereafter, the lamps are completely turned ON, which are required to irradiate the light beam of the travel mode after the light control operation of this lamp has been controlled.

When it is so judged at the step S17 that the flag is brought into the set condition, the process operation is advanced to a step S18. At this step S18, while no light control of the lamp is carried out, only the lamps required to irradiate the light beams corresponding to the travel mode are turned ON.

When the process operation is reached to the step S20, the manual light control mode is selected at the step S2 of FIG. 25. At this time, the lamps are turned ON which are required to irradiate the light beams and which are adapted to the travel mode designated by the vehicle driver.

Then, at a step S21 subsequent to the steps S18 to S20, a check is made as to whether or not the main switch for turning ON the head lamp in the turn-ON control switch unit 28 is brought into the ON state. When this main switch is brought into the ON state, the process operation is returned to the previous step S2 of FIG. 25. Conversely, when the main switch is brought into the OFF state, the process operation is advanced to a further step S22. At this step S22, the lamp is turned OFF, and thereafter, the lighting control operation is ended.

In the above-described control example, even when both the CCD camera 21 and the image processing apparatus 22 are employed, the light distribution control operation can be carried out in response to the information related to the steering angle and also the vehicle speed, for instance, the below-mentioned control mode may be employed as the control mode in the case that the above-explained beam variable type lighting member is used.

Camera interconnection mode:

That is, in the case that both the CCD camera and the image processing apparatus are operated under normal condition, the travel region is judged by using the vehicle speed data and the data which is produced by extracting the recognizing object appeared on the front road surface and also by analyzing the illuminance within either a predetermined travel distance or a preselected travel time duration. Then, a lighting control suitable for the judged travel region is carried out.

Camera non-interconnection mode:

In the case that both the CCD camera and the image processing apparatus are not operated under normal condition, or the lane mark and the like cannot be recognized under normal condition due to bad weather, the beam irradiation direction can be fitted to the traveling direction of the vehicle based upon only the detection information of the steering angle by the steering sensor and the vehicle speed information by the vehicle sensor.

Figure 28:
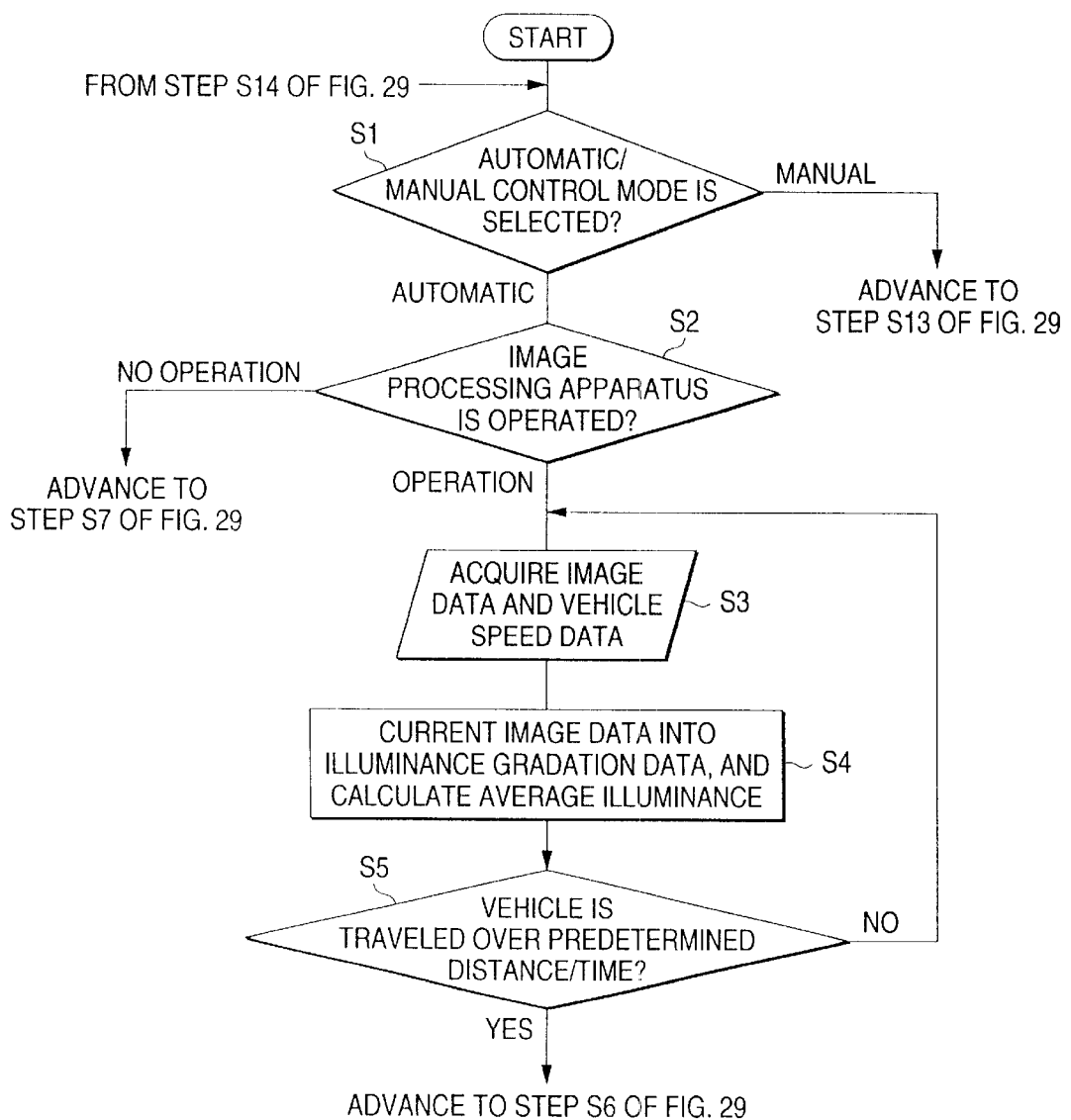
FIG. 28 is a flow chart for describing a control example executed by utilizing an illuminance measurement by an image analysis together with FIG. 29, namely this flow chart shows a front half process operation thereof.
Figure 29:
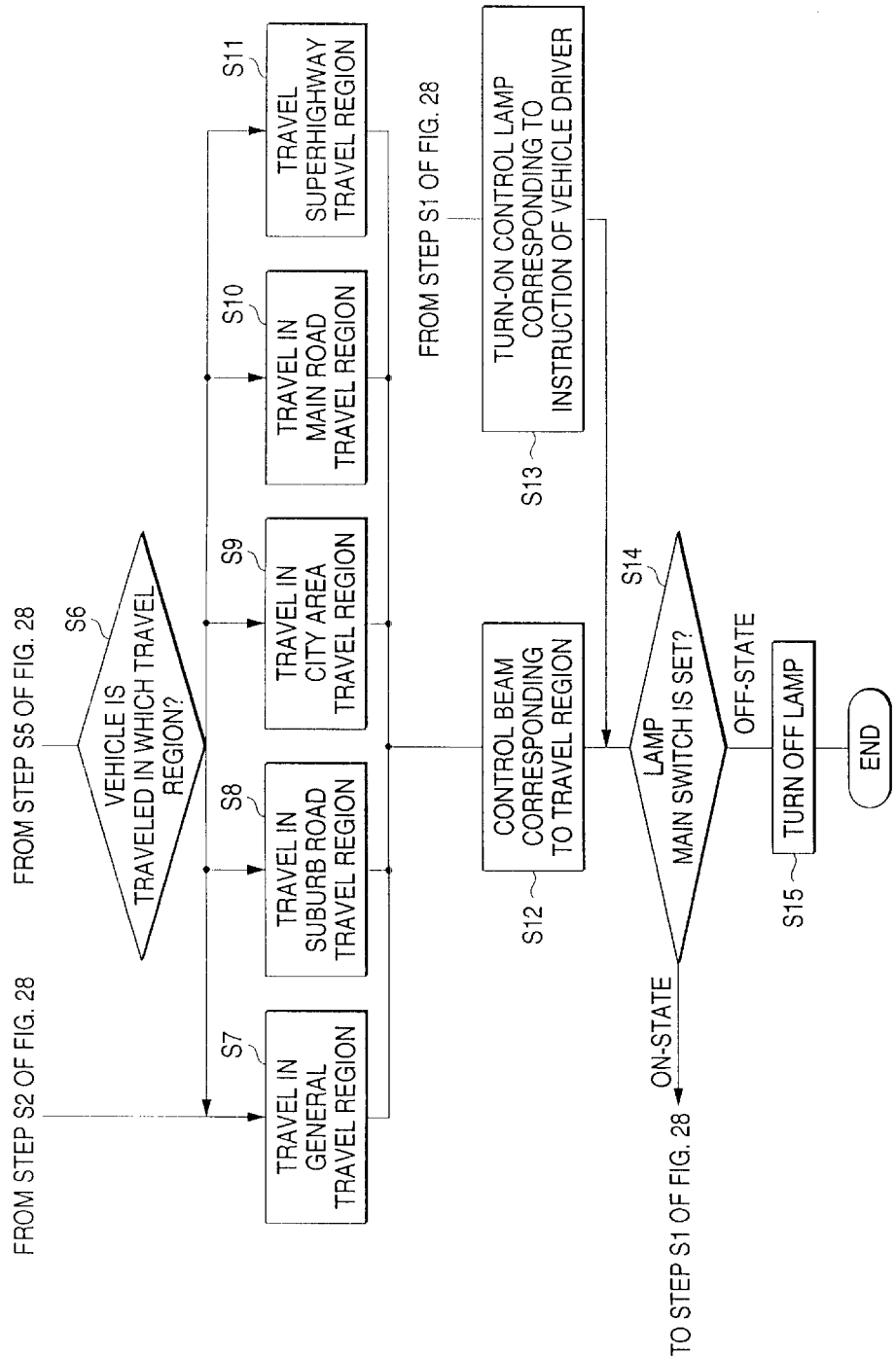
FIG. 29 is a flowchart for describing a rear half process operation of the above-described process operation shown in FIG. 28.

Referring now to flow charts shown in FIG. 28 to FIG. 29, a description is made of such a control example that a travel region is judged based upon am illuminance measurement.

First, at a step S1 of FIG. 28, a check is made as to whether the turn-ON control switch unit 28 selects the automatic lighting control mode, or the manual lighting control mode. When the automatic lighting control mode is selected, the process operation is advanced to a next step S2, whereas when the manual lighting control mode is selected, the process operation is advanced to a step S13 shown in FIG. 29.

At this step, another check is done as to whether or not the image processing apparatus 22 is operated. When the image processing apparatus 22 is operated, the process operation is advanced to a next step S3 at which front image data of the vehicle is acquired. To the contrary, when the image processing apparatus 22 is not operated, the process operation is advanced to a step S7 of FIG. 29.

It should be noted that at the step S3, detection data related to a vehicle speed and a steering angle is acquired in addition to the front image data.

At a step S4, the output value of the video signal is converted into illuminance gradation data so as to calculate an average value of the illuminance data within the imaging screen. Then, the process operation is advanced to the next step S5.

Then, at this step S5, a judgement is made as to whether or not the vehicle is traveled over a predetermined travel distance section, or for a preselected travel time duration. When the vehicle is not yet traveled over either the predetermined travel distance section or the preselected travel time duration, the process operation is returned to the step S3. To the contrary, when the vehicle has been traveled over the predetermined travel distance section/time duration, the process operation is advanced to a step S6 of FIG. 29.

At this step S6, a travel region is judged, and then, the process operation is branched to five sub-routines as defined from a step S7 to a step S11 in this control example.

At the step S7, a judgement is made of a general travel section. At the step S8, a judgment is made of a suburb road travel section. At the step S9, a judgment is made of a city area travel section. At the step S10, a judgment is made of a main road travel section. At the step S11, a judgment is made of a superhighway travel section.

At a step S12 subsequent to these steps, beam control operations are carried out in correspondence with the respective travel sections. For example, control examples in the case that the beam variable type lighting member shown in FIG. 16 and FIG. 17 is used are described as follows:

In the general travel section, the light beam which is substantially identical to the present low light beam and also which has a cut-off is distributed.

In the city area travel section, while the movable reflection mirror 12a is driven, the diffused light is secured along the right/left direction.

In the suburb road travel section, the drive angle of the variable reflection mirror 12a is made smaller than that of the city area travel section.

In the main road travel section, the drive angle of the variable reflection mirror 12a is made smaller than that of the suburb road travel section, and the shade 14 is moved slightly along the forward direction.

In the superhighway travel section, while the drive angle of the variable reflection mirror 12a is set to zero (reference position), the position of the shade 14 is moved to an intermediate position so as to secure a view field in a far range.

When the process operation is reached to the step S13, the manual light control mode is selected at the step S1 of FIG. 28. At this time, the lamps are turned ON which are required to irradiate the light beams and which are adapted to the travel mode designated by the vehicle driver.

Then, at a step S14 subsequent to the steps S12 to S13, a check is made as to whether or not the main switch for turning ON the head lamp in the turn-ON control switch unit 28 is brought into the ON state. When this main switch is brought into the ON state, the process operation is returned to the previous step S1 of FIG. 28. Conversely, when the main switch is brought into the OFF state, the process operation is advanced to a further step S15. At this step S15, the lamp is turned OFF, and thereafter, the lighting control operation is ended.

Referring now to flow charts shown in FIG. 30 and FIG. 31, a description will be made of a control example in such a case that such detection information related to operation conditions such as a steering angle, a vehicle speed, and a total braking operation time is employed in order that a travel region is judged.

Figure 30:
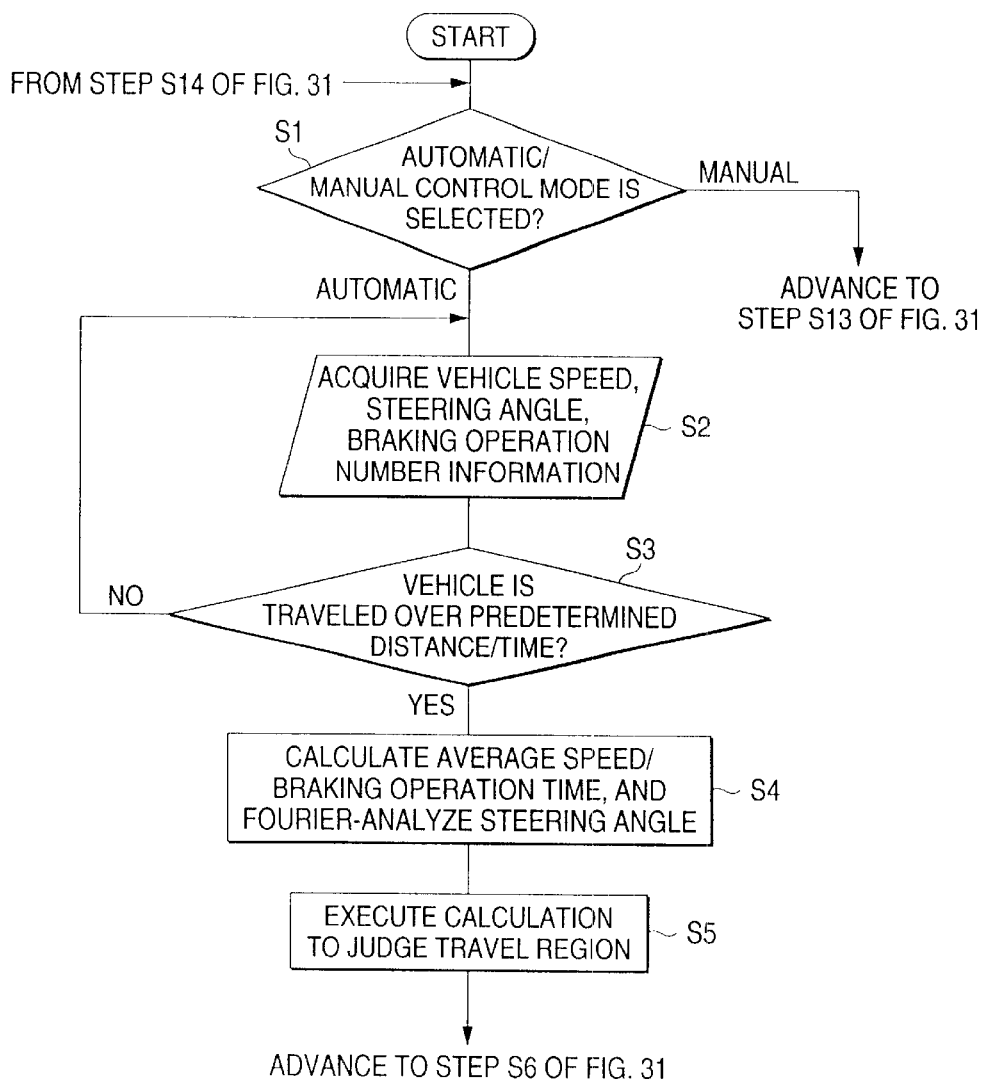
FIG. 30 is a flow chart for describing a control example executed by utilizing a steering angle, a vehicle speed, and a braking operation time together with FIG. 31, namely this flow chart shows a front half process operation thereof.
Figure 31:
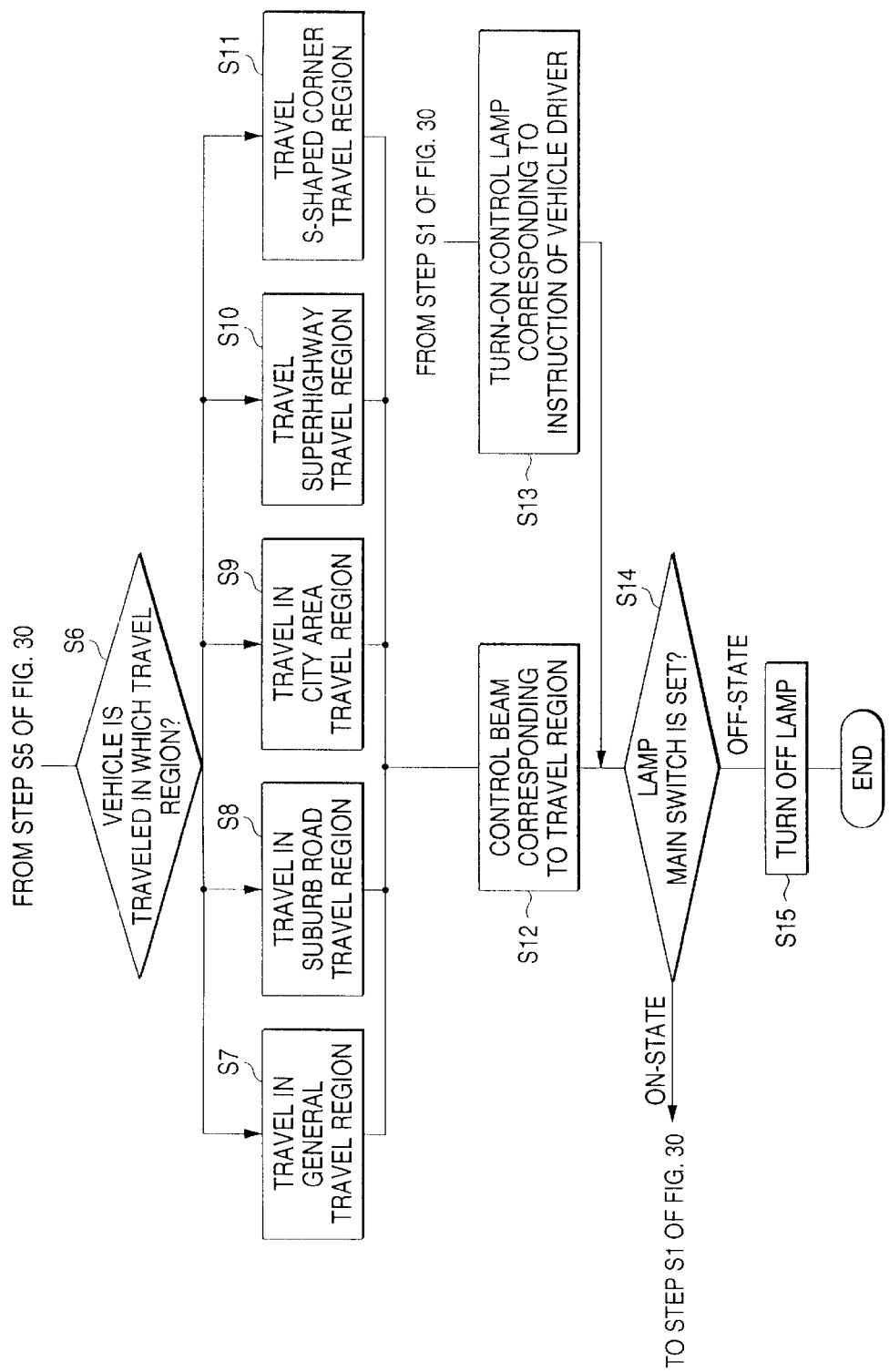
FIG. 31 is a flow chart for describing a rear half process operation of the above-described process operation shown in FIG. 30.

First, at a step S1 of FIG. 30, a check is made as to whether the turn-ON control switch unit 28 selects the automatic lighting control mode, or the manual lighting control mode. When the automatic lighting control mode is selected, the process operation is advanced to a further step S2, whereas when the manual lighting control mode is selected, the process operation is advanced to a step S13 shown in FIG. 31.

At the step S2, detection information related to a vehicle speed, a steering angle, a total braking operation time is acquired. Then, the process operation is advanced to the next step S3.

Then, at this step S3, a judgement is made as to whether or not the vehicle is traveled over a predetermined travel distance section, or for a preselected travel time duration. When the vehicle is not yet traveled over either the predetermined travel distance section or the preselected travel time duration, the process operation is returned to the step S2. To the contrary, when the vehicle has been traveled over the predetermined travel distance section/time duration, the process operation is advanced to a next step S4.

At the step S4, an average vehicle speed is calculated from the data acquired from the previous step S2, and/or a total braking operation time per a travel distance is calculated from this acquired data. Also, a Fourier-transform is carried out as to the detection signal of the steering angle (it should be noted that these calculation process operations are carried out in the travel region judging apparatus 23).

At a step S5, a calculation process operation required to judge a travel region is carried out. In other words, in comparison with map data (see FIG. 8) in which a relationship between an average vehicle speed and a braking operation time has been previously investigated with respect to a travel section, a prediction is made that both the average vehicle speed and the braking operation time calculated at the previous step S4 may occupy which positions. Also, in comparison with data about a characteristic of a Fourier-transformed frequency (see FIG. 7), a travel path of the own vehicle is predicted based upon the magnitude of the amplitude and the center frequency acquired at the previous step.

At this step S6, a travel region is judged, and then, the process operation is branched to five sub-routines as defined from a step S7 to a step S11 in this control example.

At the step S7, a judgement is made of a general travel section. At the step S8, a judgment is mad of a suburb road travel section. At the step S9, a judgment is made of a city area travel section. At the steps S10, a judgment is made of a superhighway travel section. At the step S11, a judgment is made of a S-shaped corner travel section.

At a step S12 subsequent to these steps, beam control operations are carried out in correspondence with the respective travel sections. It should be understood that the beam control operations have already been described which are carried out with respect to the general travel section, the city area travel section, the suburb road travel section, and the superhighway travel section. In the S-shaped corner travel section, for instance, the beam control operation is carried out in such a manner that the beam irradiation direction may be fitted to the traveling direction of the vehicle based upon both the detection information of the steering angle and the vehicle speed information.

When the process operation is reached to the step S13, the manual light control mode is selected at the step S1 of FIG. 30. At this time, the lamps are turned ON which are required to irradiate the light beams and which are adapted to the travel mode designated by the vehicle driver.

Then, at a step S14 subsequent to the steps S12 to S13, a check is made as to whether or not the main switch for turning ON the head lamp in the turn-ON control switch unit 28 is brought into the ON state. When this main switch is brought into the ON state, the process operation is returned to the previous step S1 of FIG. 30. Conversely, when the main switch is brought into the OFF state, the process operation is advanced to a further step S15. At this step S15, the lamp is turned OFF, and thereafter, the lighting control operation is ended.

It should also be noted that the above-explained embodiments are merely described in order to embody the inventive idea of the present invention. Apparently, various sorts and various modes of the present invention maybe realized by combining various sorts of methods, various selecting ways of travel regions, and various control modes with each other.

As apparent from the above descriptions, in accordance with the present invention, the information indicative of the travel environment as to the travel path of the vehicle is acquired, and then the sort of this travel path is judged based upon this acquired information. As a result, the lighting control operation can be properly carried out in response to the travel region, so that the safety drive of the vehicle in the night can be improved.

Further, the travel region can be easily judged based on a total link number of nodes appeared on the traveling path of the own vehicle.

Furthermore, the judgment as to whether or not the travel region corresponds to such a region where the curved path is continued can be carried out by a relatively simple calculation manner based upon the vector for coupling the nodes to each other which are located adjacent to each other, or the spline curve which passes through the respective nodes on the traveling path of the own vehicle.

Furthermore, since the road sign and the mark made on the path are detected, the travel region can be precisely judged.

Furthermore, while the brightness of the peripheral area of the own vehicle is detected without specifying the object to be recognized, the travel region can be judged.

Furthermore, since the data acquired by detecting the driving condition containing the change in either the steering angle or the yaw angle, the total braking operation time, and the vehicle speed are utilized, the travel region can be further firmly judged.

What is claimed is:

1. A vehicle lighting apparatus comprising:
   travel environment detecting means for acquiring information indicative of a travel environment related to a travel path of a vehicle;
   travel region judging means for judging a travel region where the vehicle is presently traveling based upon the information acquired by said travel environment detecting means; and
   lighting control means for performing lighting control of a vehicle lighting member in response to a judgement signal derived from said travel region judging means, wherein said vehicle lighting member comprises a plurality of lamps, and a beam is irradiated in accordance with the judgment signal.

2. A vehicle lighting apparatus as claimed in claim 1, wherein said travel environment detecting means comprises a navigation apparatus; and
   said travel region judging means judges whether or not the travel region corresponds to a city area by checking a total number of links of nodes of a vehicle travel path, an average value thereof, or an increase/decrease trend thereof, said link numbers of the nodes of the vehicle travel path being acquired from said navigation apparatus.

3. A vehicle lighting apparatus as claimed in claim 1, wherein said travel environment detecting means comprises a navigation apparatus; and
   said travel region judging means judges whether or not the travel region corresponds to a region where a curved path is continued by calculating an outer product of vectors used to connect nodes to each other, which are located adjacent to each other on the vehicle travel path and are acquired from said navigation apparatus, or by counting the number of inflection points appeared on a spline curve which passes through the respective nodes.

4. A vehicle lighting apparatus as claimed in claim 1, wherein:
   said travel environment detecting means comprises imaging means for imaging a scene in front of the vehicle, or a scene surrounding the vehicle; and
   said travel region judging means judges whether or not the travel region corresponds to a city area by detecting a road sign, or a mark made on a road by said imaging means.

5. A vehicle lighting apparatus as claimed in claim 4, wherein said travel region judging means judges whether or not the travel region corresponds to the city area by counting a total number of traffic road signs recognized by said imaging means in order to check whether or not the number of counted traffic road signs is larger than a predetermined number.

6. A vehicle lighting apparatus as claimed in claim 4, wherein, while the brightness of a peripheral area of the vehicle is detected by said imaging means, said travel region judging means judges whether or not the travel region corresponds to the city area based upon the detected degree of brightness.

7. A vehicle lighting apparatus as claimed in claim 1, further comprising:
   detection means for detecting a drive condition containing a change in either a steering angle or a yaw angle, a total number of braking operations, and a vehicle velocity; and
   wherein said travel region judging means judges whether or not the travel region corresponds to a city road based upon the detection of said drive condition by said detection means.

8. A vehicle lighting apparatus as claimed in claim 1, wherein said travel environment detecting means comprises a navigation apparatus; and
   said travel region judging means judges whether or not the travel region corresponds to a city area in accordance with landmark data acquired from said navigation apparatus.

9. A vehicle lighting apparatus as claimed in claim 6, wherein outer light information comprising daylight condition of the travel path and artificial illumination are obtained based on date and time information, and said travel region judging means judges the travel region based on the outer light information.

10. A vehicle lighting apparatus as claimed in claim 6, wherein said imaging means detects the environmental brightness in accordance with weather information.

11. A vehicle lighting apparatus as claimed in claim 1, said travel region judging means judges the travel region based on a relationship between a vehicle speed and a number of braking operations.

12. A vehicle lighting apparatus as claimed in claim 1, wherein when said travel region judging means judges the travel region to be a city area, said lighting control means lights a city area traveling light beam which irradiates toward a side direction as diffusion lighting.

13. A vehicle lighting apparatus as claimed in claim 1, wherein when said travel region judging means judges the travel region to be a suburb area, said lighting control means lights a suburb road traveling light beam which irradiates an area in front of the vehicle from a medium distance to a far distance.

14. A vehicle lighting apparatus as claimed in claim 1, wherein when said travel region judging means judges the travel region to be a highway, said lighting control means lights a highway traveling light beam which irradiates an area that is a far distance in front of the vehicle.

15. A vehicle lighting apparatus as claimed in claim 1, said vehicle lighting member comprises a light distribution controlling mechanism for variably-controlling a light distribution so that a beam is irradiated in accordance with the judgment signal.

16. A vehicle lighting apparatus as claimed in claim 1, further comprising a switching means for switching a beam control mode between automatic and manual modes.

17. A vehicle lighting apparatus as claimed in claim 16, wherein when said automatic mode is selected, the lighting control is carried out in accordance with the travel region judging means.

18. A vehicle lighting apparatus as claimed in claim 16, wherein when said manual mode is selected, the lighting control is carried out in accordance with an operator command.

19. A vehicle lighting apparatus comprising:
   a travel environment detector that acquires information indicative of a travel environment related to a travel path of a vehicle;
   a travel region analyzer that analyzes a travel region where the vehicle is presently traveling based upon the information acquired by said travel environment detector; and
   a lighting controller that operates a vehicle light in response to a judgement signal derived from said travel region analyzer, wherein said vehicle light comprises a plurality of lamps, and a beam is irradiated in accordance with the judgment signal.

20. A vehicle lighting apparatus comprising:

a travel environment detector that acquires information indicative of a travel environment related to a travel path of a vehicle;

a travel region analyzer that analyzes a travel region where the vehicle is presently traveling based upon the information acquired by said travel environment detector; and a lighting controller that operates a vehicle light in response to a judgement signal derived from said travel region analyzer; and a switch for switching a beam control mode between automatic and manual modes.

* * * * *